(12) United States Patent
Myslinski

(10) Patent No.: US 9,367,622 B2
(45) Date of Patent: *Jun. 14, 2016

(54) EFFICIENT WEB PAGE FACT CHECKING METHOD AND SYSTEM

(71) Applicant: Lucas J. Myslinski, Sunnyvale, CA (US)

(72) Inventor: Lucas J. Myslinski, Sunnyvale, CA (US)

( * ) Notice: Subject to any disclaimer, the term of this patent is extended or adjusted under 35 U.S.C. 154(b) by 186 days.

This patent is subject to a terminal disclaimer.

(21) Appl. No.: 14/291,374

(22) Filed: May 30, 2014

(65) Prior Publication Data

US 2015/0248490 A1    Sep. 3, 2015

Related U.S. Application Data

(63) Continuation of application No. 14/203,899, filed on Mar. 11, 2014, now Pat. No. 8,990,234.

(60) Provisional application No. 61/946,038, filed on Feb. 28, 2014.

(51) Int. Cl.
| | | |
|---|---|---|
| *G06F 7/00* | (2006.01) | |
| *G06F 17/30* | (2006.01) | |
| *G06F 17/27* | (2006.01) | |
| *G06N 5/04* | (2006.01) | |
| *G06F 3/041* | (2006.01) | |

(52) U.S. Cl.
CPC ........ *G06F 17/30864* (2013.01); *G06F 3/0412* (2013.01); *G06F 17/2705* (2013.01); *G06F 17/30542* (2013.01); *G06F 17/30684* (2013.01); *G06F 17/30705* (2013.01); *G06F 17/30867* (2013.01); *G06N 5/047* (2013.01); *G06N 5/048* (2013.01)

(58) Field of Classification Search
CPC .......... G06F 17/30867; G06F 17/2705; G06F 17/30542; G06F 3/0412; G06F 17/30864; G06F 17/30705; G06F 17/30684
See application file for complete search history.

(56) References Cited

U.S. PATENT DOCUMENTS

| | | | |
|---|---|---|---|
| 5,960,411 | A | 9/1999 | Hartman et al. |
| 6,161,090 | A | 12/2000 | Kanevsky et al. |
| 6,256,734 | B1 | 7/2001 | Blaze et al. |
| 6,266,664 | B1 | 7/2001 | Russell-Falla et al. |
| 6,782,510 | B1 | 8/2004 | Gross et al. |
| 7,249,058 | B2 | 7/2007 | Kim et al. |
| 7,249,380 | B2 | 7/2007 | Yang |

(Continued)

FOREIGN PATENT DOCUMENTS

| | | |
|---|---|---|
| GB | 2428529 A | 1/2007 |
| WO | 0177906 A2 | 10/2001 |

(Continued)

OTHER PUBLICATIONS

Notice of Allowance for U.S. Appl. No. 14/328,901.

(Continued)

*Primary Examiner* — Azam Cheema
(74) *Attorney, Agent, or Firm* — Haverstock & Owens LLP

(57) ABSTRACT

An efficient fact checking system analyzes and determines the factual accuracy of information and/or characterizes the information by comparing the information with source information. The efficient fact checking system automatically monitors information, processes the information, fact checks the information efficiently and/or provides a status of the information.

18 Claims, 14 Drawing Sheets

(56) References Cited

U.S. PATENT DOCUMENTS

| | | | |
|---|---|---|---|
| 7,266,116 B2 | 9/2007 | Halpern | |
| 7,337,462 B2 | 2/2008 | Dudkiewicz et al. | |
| 7,478,078 B2 | 1/2009 | Lunt et al. | |
| 7,487,334 B2 | 2/2009 | Konigsburg et al. | |
| 7,644,088 B2 | 1/2010 | Fawcett et al. | |
| 7,657,424 B2 | 2/2010 | Bennett | |
| 7,765,574 B1 | 7/2010 | Maybury et al. | |
| 7,809,721 B2 | 10/2010 | Putivsky et al. | |
| 8,185,448 B1* | 5/2012 | Myslinski | G06Q 10/10 705/26.1 |
| 8,225,164 B2 | 7/2012 | Westerlund et al. | |
| 8,229,795 B1 | 7/2012 | Myslinski | |
| 8,290,924 B2 | 10/2012 | Rajaram | |
| 8,290,960 B2 | 10/2012 | Li et al. | |
| 8,321,295 B1 | 11/2012 | Myslinski | |
| 8,401,919 B2 | 3/2013 | Myslinski | |
| 8,423,424 B2 | 4/2013 | Myslinski | |
| 8,458,046 B2 | 6/2013 | Myslinski | |
| 8,510,173 B2 | 8/2013 | Myslinski | |
| 8,583,509 B1 | 11/2013 | Myslinski | |
| 2002/0083468 A1 | 6/2002 | Dudkiewicz | |
| 2002/0099730 A1 | 7/2002 | Brown et al. | |
| 2003/0088689 A1 | 5/2003 | Alexander, Jr. et al. | |
| 2003/0158872 A1 | 8/2003 | Adams | |
| 2003/0210249 A1 | 11/2003 | Simske | |
| 2004/0103032 A1 | 5/2004 | Maggio | |
| 2004/0122846 A1 | 6/2004 | Chess et al. | |
| 2004/0139077 A1 | 7/2004 | Banker | |
| 2004/0210824 A1 | 10/2004 | Shoff et al. | |
| 2005/0022252 A1 | 1/2005 | Shen | |
| 2005/0060312 A1 | 3/2005 | Curtiss et al. | |
| 2005/0120391 A1 | 6/2005 | Haynie et al. | |
| 2005/0132420 A1 | 6/2005 | Howard et al. | |
| 2005/0235199 A1 | 10/2005 | Adams | |
| 2006/0015904 A1 | 1/2006 | Marcus | |
| 2006/0064633 A1 | 3/2006 | Adams | |
| 2006/0148446 A1 | 7/2006 | Karlsson | |
| 2006/0206912 A1 | 9/2006 | Klarfeld et al. | |
| 2006/0212904 A1 | 9/2006 | Klarfeld et al. | |
| 2006/0248076 A1 | 11/2006 | Troy et al. | |
| 2006/0253580 A1 | 11/2006 | Dixon et al. | |
| 2006/0293879 A1* | 12/2006 | Zhao | G06F 17/30864 704/9 |
| 2007/0011710 A1 | 1/2007 | Chiu | |
| 2007/0043766 A1 | 2/2007 | Nicholas et al. | |
| 2007/0100730 A1 | 5/2007 | Batashvili et al. | |
| 2007/0136781 A1 | 6/2007 | Kawai | |
| 2007/0136782 A1 | 6/2007 | Ramaswamy et al. | |
| 2007/0288978 A1 | 12/2007 | Pizzurro et al. | |
| 2008/0077570 A1 | 3/2008 | Tang et al. | |
| 2008/0109285 A1 | 5/2008 | Reuther et al. | |
| 2008/0109780 A1 | 5/2008 | Stern et al. | |
| 2008/0183726 A1 | 7/2008 | Bruckner et al. | |
| 2008/0319744 A1 | 12/2008 | Goldberg | |
| 2009/0063294 A1 | 3/2009 | Hoekstra et al. | |
| 2009/0125382 A1 | 5/2009 | Delepet | |
| 2009/0210395 A1 | 8/2009 | Sedam | |
| 2009/0265304 A1 | 10/2009 | Ait-Mokhtar et al. | |
| 2009/0311659 A1 | 12/2009 | Lottridge et al. | |
| 2010/0023525 A1 | 1/2010 | Westerlund et al. | |
| 2010/0049590 A1 | 2/2010 | Anshul | |
| 2010/0121638 A1 | 5/2010 | Pinson et al. | |
| 2010/0121973 A1 | 5/2010 | Lobacheva et al. | |
| 2010/0235313 A1 | 9/2010 | Rea et al. | |
| 2010/0306166 A1 | 12/2010 | Pantel et al. | |
| 2010/0332583 A1 | 12/2010 | Szabo | |
| 2011/0043652 A1 | 2/2011 | King et al. | |
| 2011/0066587 A1 | 3/2011 | Ferrucci et al. | |
| 2011/0067065 A1 | 3/2011 | Karaoguz et al. | |
| 2011/0087639 A1 | 4/2011 | Gurney | |
| 2011/0093258 A1 | 4/2011 | Xu et al. | |
| 2011/0106615 A1 | 5/2011 | Churchill et al. | |
| 2011/0136542 A1 | 6/2011 | Sathish | |
| 2011/0166860 A1 | 7/2011 | Tran | |
| 2011/0313757 A1 | 12/2011 | Hoover et al. | |
| 2012/0005221 A1 | 1/2012 | Ickman et al. | |
| 2012/0102405 A1 | 4/2012 | Zuckerman et al. | |
| 2012/0131015 A1 | 5/2012 | Al Badrashiny et al. | |
| 2012/0158711 A1 | 6/2012 | Curtiss et al. | |
| 2012/0191757 A1 | 7/2012 | Gross et al. | |
| 2012/0198319 A1 | 8/2012 | Agnoli et al. | |
| 2012/0272143 A1 | 10/2012 | Gillick | |
| 2012/0317046 A1 | 12/2012 | Myslinski | |
| 2013/0060757 A1 | 3/2013 | Myslinski | |
| 2013/0074110 A1 | 3/2013 | Myslinski | |
| 2013/0091436 A1 | 4/2013 | Rose et al. | |
| 2013/0099925 A1 | 4/2013 | Pederson | |
| 2013/0110748 A1 | 5/2013 | Talati et al. | |
| 2013/0151240 A1 | 6/2013 | Myslinski | |
| 2013/0158984 A1 | 6/2013 | Myslinski | |
| 2013/0159127 A1 | 6/2013 | Myslinski | |
| 2013/0191298 A1 | 7/2013 | Myslinski | |
| 2013/0198196 A1 | 8/2013 | Myslinski | |
| 2013/0218788 A1* | 8/2013 | Terheggen | G06Q 30/018 705/317 |
| 2013/0308920 A1 | 11/2013 | Myslinski | |
| 2013/0311388 A1 | 11/2013 | Myslinski | |
| 2013/0346160 A1 | 12/2013 | Dunst | |
| 2014/0074751 A1 | 3/2014 | Rocklitz | |

FOREIGN PATENT DOCUMENTS

| | | |
|---|---|---|
| WO | 0177907 A2 | 10/2001 |
| WO | 03014949 A1 | 2/2003 |
| WO | 2004034755 A2 | 4/2004 |
| WO | 2006036853 A2 | 6/2006 |
| WO | 2007115224 A2 | 10/2007 |
| WO | 2009006542 A2 | 1/2009 |
| WO | 2009089116 | 7/2009 |
| WO | 2010093510 A1 | 8/2010 |
| WO | 2010105245 A2 | 9/2010 |
| WO | 2011088264 A1 | 7/2011 |
| WO | 2015/044179 | 4/2015 |

OTHER PUBLICATIONS

Office Action for U.S. Appl. No. 14/611,420.
Notice of Allowance for U.S. Appl. No. 14/611,420.
Office Action for U.S. Appl. No. 14/611,454.
Notice of Allowance for U.S. Appl. No. 14/611,454.
Sorry for the Spam, Truth Goggles, <http://slifty.com/projects/truth-goggles/>, Oct. 29, 2012.
LazyTruth Chrome extension fact checks chain emails, <http://www.theverge.com/2012/11/14/3646294/lazytruth-fact-check-chain-email>, Nov. 14, 2012.
Announcing Truth Teller beta, a better way to watch political speech, <http://www.washingtonpost.com/blogs/ask-the-post/wp/2013/09/25/announcing-truth-teller-beta-a-better-way-to-watch-political-speech/>, Sep. 25, 2013.
Notice of Allowance including reasons for allowance from U.S. Appl. No. 14/203,899.
Ulken, A Question of Balance: Are Google News search results politically biased? May 5, 2005, <http://ulken.com/thesis/googlenews-bias-study.pdf>.
<http://jayrosen.posterous.com/my-simple-fix-for-the-messed-up-sunday-shows> (Dec. 27, 2009).
<http://en.wikipedia.org/wiki/SpinSpotter> (Jul. 1, 2010).
Notice of Allowance including reasons for allowance from U.S. Appl. No. 13/287,804.
Accelerated Examination Support Document from U.S. Appl. No. 13/287,804.
Preexam Search Document from U.S. Appl. No. 13/287,804.
Wendell Cochran; Journalists aren't frauds; the business has fine lines; Ethics classes would help them stay on right side; The Sun. Baltimore, MD.: Jul 19, 1998. p. 6.C; http://proquest.umi.com/pqdweb?did=32341381&sid=3&Fmt=3&clientId=19649&RQT=309&VName=PQD.
Notice of Allowance including reasons for allowance from U.S. Appl. No. 13/448,991.

(56) References Cited

OTHER PUBLICATIONS

Notice of Allowance including reasons for allowance from U.S. Appl. No. 13/528,563.
Notice of Allowance including reasons for allowance from U.S. Appl. No. 13/632,490.
Notice of Allowance including reasons for allowance from U.S. Appl. No. 13/669,711.
Notice of Allowance including reasons for allowance from U.S. Appl. No. 13/669,819.
Office Action from U.S. Appl. No. 13/669,711.
Office Action from U.S. Appl. No. 13/669,819.
Notice of Allowance including reasons for allowance from U.S. Appl. No. 13/760,408.
Notice of Allowance including reasons for allowance from U.S. Appl. No. 13/946,333.
Office Action from U.S. Appl. No. 13/946,333.
Ryosuke Nagura et al: "A method of rating the credibility of news documents on the web," Proceedings of the 29th Annual International ACM SIGIR Conference on Research and Development in Information Retrieval, SIGIR '06, Aug. 6, 2006, p. 683.
Andreas Juffinger et al.: "Blog credibility ranking by exploiting verified content," Proceedings of the 3rd Workshop on Information Credibility on the Web, WICOW '09, Apr. 20, 2009, p. 51.

* cited by examiner

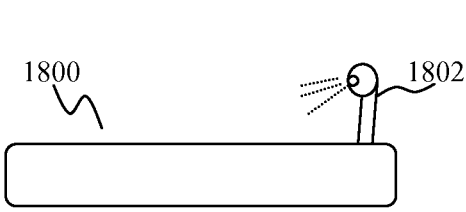
Fig. 18
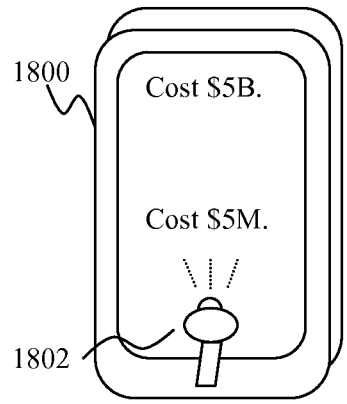
Fig. 19
Analyzing body language information. 2000
↓
Fact checking information. 2002
↓
Analyzing the format of the information. 2004
↓
Analyzing a validity rating of the entity. 2006
↓
Presenting a fact check result. 2008
Fig. 20

| January 2014 – Network Z – The News Situation Room |||||||
|---|---|---|---|---|---|---|
| | | | 1  X | 2 | 3  .. | 4  o |
| 5  · X | 6  X X | 7  ..... | 8 | 9 | 10  o o o | 11  o o |
| 12  X X | 13  X X | 14  X X ? | 15  ..... | 16  X | 17  o o o | 18  . |
| 19 | 20 | 21  X X | 22 | 23  X X | 24  X X | 25  · · |
| 26 | 27  X X ? | 28  ..... | 29 | 30  X X | 31  · | | ized

EFFICIENT WEB PAGE FACT CHECKING METHOD AND SYSTEM

CROSS-REFERENCE TO RELATED APPLICATION(S)

This application is a continuation application of co-pending U.S. patent application Ser. No. 14/203,899, filed on Mar. 11, 2014, and titled "EFFICIENT FACT CHECKING METHOD AND SYSTEM," which claims the benefit of U.S. Provisional Patent Application Ser. No. 61/946,038, filed Feb. 28, 2014, and titled "EFFICIENT FACT CHECKING METHOD AND SYSTEM," which are hereby incorporated by reference in their entireties for all purposes.

FIELD OF THE INVENTION

The present invention relates to the field of information analysis. More specifically, the present invention relates to the field of automatically verifying the factual accuracy of information.

BACKGROUND OF THE INVENTION

Information is easily dispersed through the Internet, television, social media and many other outlets. The accuracy of the information is often questionable or even incorrect. Although there are many fact checkers, they typically suffer from efficiency issues.

SUMMARY OF THE INVENTION

An efficient fact checking system analyzes and determines the factual accuracy of information and/or characterizes the information by comparing the information with source information. The efficient fact checking system automatically monitors information, processes the information, fact checks the information efficiently and/or provides a status of the information.

The efficient fact checking system provides users with factually accurate information, limits the spread of misleading or incorrect information, provides additional revenue streams, and supports many other advantages.

BRIEF DESCRIPTION OF THE DRAWINGS

FIG. 18 illustrates a side view of a mobile device configured for projecting fact checking results on the screen according to some embodiments.

FIG. 19 illustrates a front view of a mobile device configured for projecting fact checking results on the screen according to some embodiments.

FIG. 20 illustrates a flowchart of a method of utilizing multiple aspects for fact checking according to some embodiments.

DETAILED DESCRIPTION OF THE PREFERRED EMBODIMENT

An efficient fact checking system determines the factual accuracy of information by comparing the information with source information. Additional analysis is able to be implemented as well such as characterizing the information.

Figure 1:
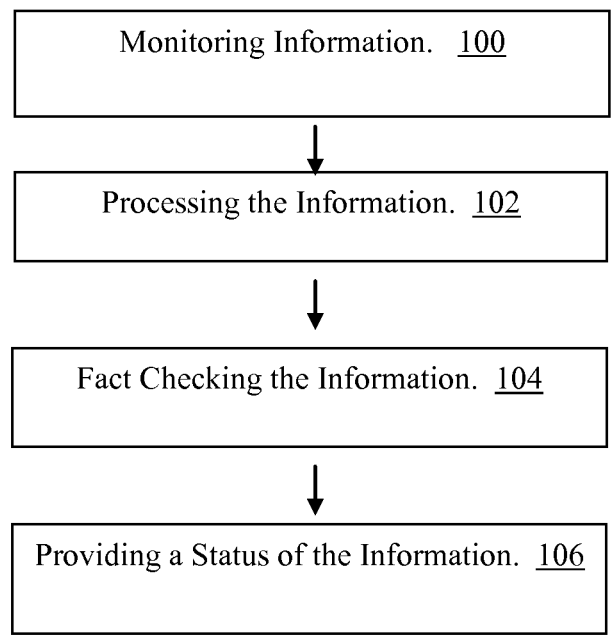
FIG. 1 illustrates a flowchart of a method of implementing efficient fact checking according to some embodiments.

FIG. 1 illustrates a flowchart of a method of implementing efficient fact checking according to some embodiments.

In the step 100, information is monitored. In some embodiments, all information or only some information (e.g., a subset less than all of the information) is monitored. In some embodiments, only explicitly selected information is monitored. In some embodiments, although all information is monitored, only some information (e.g., information deemed to be fact-based) is fact checked.

The information includes, but is not limited to, broadcast information (e.g., television broadcast information, radio broadcast information), email, documents, database information, social networking/media content (tweets/Twitter®, Facebook® postings), webpages, message boards, web logs, any computing device communication, telephone calls/communications, audio, text, live speeches/audio, radio, television video/text/audio, VoIP calls, video chatting, video conferencing, images, videos, and/or any other information. The information is able to be in the form of phrases, segments, sentences, numbers, words, comments, values, graphics, and/or any other form.

In some embodiments, monitoring includes recording, scanning, capturing, transmitting, tracking, collecting, surveying, and/or any other type of monitoring. In some embodiments, monitoring includes determining if a portion of the information is able to be fact checked. For example, if information has a specified structure, then it is able to be fact checked.

In some embodiments, the efficient fact checking system is implemented without monitoring information. This is able to be implemented in any manner. For example, while information is transmitted from a source, the information is also processed and fact checked so that the fact check result is able to be presented. In some embodiments, the fact check result is embedded in the same stream as the information. In some embodiments, the fact check result is in the header of a packet.

In the step 102, the information is processed. Processing is able to include many aspects including, but not limited to, converting (e.g., audio into text), formatting, parsing, determining context, transmitting, converting an image into text, analyzing and reconfiguring, and/or any other aspect that enables the information to be fact checked efficiently. Parsing, for example, includes separating a long speech into separate phrases that are each separately fact checked. For example, a speech may include 100 different facts that should be separately fact checked. In some embodiments, the step 102 is able to be skipped if processing is not necessary (e.g., text may not need to be processed). In some embodiments, processing includes converting the information into a searchable format. In some embodiments, processing occurs concurrently with monitoring. In some embodiments, processing includes capturing/receiving and/or transmitting the information (e.g., to/from the cloud).

In a specific example of processing, information is converted into searchable information (e.g., audio is converted into searchable text), and then the searchable information is parsed into fact checkable portions (e.g., segments of the searchable text; several word phrases).

Parsing is able to be implemented in any manner including, but not limited to, based on sentence structure (e.g., subject/verb determination), based on punctuation including, but not limited to, end punctuation of each sentence (e.g., period, question mark, exclamation point), intermediate punctuation such as commas and semi-colons, based on other grammatical features such as conjunctions, based on capital letters, based on a duration of a pause between words (e.g., 2 seconds), based on duration of a pause between words by comparison (e.g., typical pauses between words for user are 0.25 seconds and pauses between thoughts are 1 second)—the user's speech is able to be analyzed to determine speech patterns such as length of pauses between words lasting a fourth of the length for pauses between thoughts or sentences, based on a change of a speaker (e.g., speaker A is talking, then speaker B starts talking), based on a word count (e.g., 10 word segments), based on speech analysis, based on a slowed down version (recording the content, slowing down the recorded content to determine timing breaks), based on keywords/key phrases, based on search results, and/or any other manner. In some embodiments, processing includes, but is not limited to, calculating, computing, storing, recognition, speaker recognition, language (word, phrase, sentence, other) recognition, labeling, and/or characterizing.

In the step 104, the information is fact checked efficiently. Fact checking includes comparing the information to source information to determine the factual validity, accuracy, quality, character and/or type of the information. In some embodiments, the source information includes web pages on the Internet, one or more databases, dictionaries, encyclopedias, social network information, video, audio, any other communication, any other data, one or more data stores and/or any other source.

In some embodiments, the comparison is a text comparison such as a straight word for word text comparison. In some embodiments, the comparison is a context/contextual comparison. In some embodiments, a natural language comparison is used. In some embodiments, pattern matching is utilized. In some embodiments, an intelligent comparison is implemented to perform the fact check. In some embodiments, exact match, pattern matching, natural language, intelligence, context, and/or any combination thereof is used for the comparison. Any method of analyzing the source information and/or comparing the information to the source information to analyze and/or characterizing the information is able to be implemented. An exemplary implementation of fact checking includes searching (e.g., a search engine's search), parsing the results or searching through the results of the search, comparing the results with the information to be checked using one or more of the comparisons (e.g., straight text, context or intelligent) and retrieving results based on the comparison (e.g., if a match is found return "True"). The results are able to be any type including, but not limited to, binary, Boolean (True/False), text, numerical, and/or any other format. In some embodiments, determining context and/or other aspects of converting could be implemented in the step 104. In some embodiments, the sources are rated and/or weighted. For example, sources are able to be given more weight based on accuracy of the source, type of the source, user preference, user selections, classification of the source, and/or any other weighting factor. The weighting is then able to be used in determining the fact check result. For example, if a highly weighted or rated source agrees with a comment, and a low weighted source disagrees with the comment, the higher weighted source is used, and "valid" or a similar result is returned.

In the step 106, a status of the information is provided based on the fact check result. The status is provided in any manner including, but not limited to, transmitting and/or displaying text, highlighting, underlining, color effects, a visual or audible alert or alarm, a graphical representation, and/or any other indication. The meaning of the status is able to be any meaning including, but not limited to, correct, incorrect, valid, true, false, invalid, opinion, hyperbole, sarcasm, hypocritical, comedy, unknown, questionable, suspicious, need more information, questionable, misleading, deceptive, possibly, close to the truth, and/or any other status.

The status is able to be presented in any manner, including, but not limited to, lights, audio/sounds, highlighting, text, a text bubble, a scrolling text, color gradient, headnotes/footnotes, an iconic or graphical representation, a video or video clip, music, other visual or audio indicators, a projection, a hologram, a tactile indicator including, but not limited to, vibrations, an olfactory indicator, a Tweet, a text message (SMS, MMS), an email, a page, a phone call, a social networking page/transmission/post/content, or any combination thereof. For example, text is able to be highlighted or the text color is able to change based on the validity of the text. For example, as a user types a social network message, the true statements are displayed in green, the questionable statements are displayed in yellow, and the false statements are displayed in red. In some embodiments, providing the status includes transmitting and/or broadcasting the status to one or more devices (e.g., televisions).

The status is also able to include other information including, but not limited to, statistics, citations and/or quotes.

Providing the status of the information is also able to include providing additional information related to the fact checked information, such as an advertisement. In some embodiments, providing includes pointing out, showing, displaying, recommending, playing, presenting, announcing, arguing, convincing, signaling, asserting, persuading, demonstrating, denoting, expressing, hinting, illustrating, implying, tagging, labeling, characterizing, and/or revealing.

In some embodiments, the efficient fact checking system is implemented such that responses, validity determinations and/or status presentations are available in real-time or near real-time. By real-time, it is meant instantaneously (e.g., within 1 second); whereas near real-time is within a few seconds (e.g., within 5 seconds). Furthermore, since the monitoring, processing, fact checking and providing status are all able to be performed automatically without user intervention, real-time also means faster than having a human perform the search and presenting results. Depending on the implementation, in some embodiments, the indication is presented in at most 1 second, at most several seconds (e.g., at most 5 seconds), at most a minute (not real-time), at most several minutes or by the end of a show. In some embodiments, the time amount (e.g., at most 1 second) begins once a user pauses in typing, once a phrase has been communicated, once a phrase has been determined, at the end of a sentence, once an item is flagged, or another point in a sequence. For example, as soon as a phrase is detected, the efficient fact checking system checks the fact, returns a result and displays an indication based on the result in less than 1 second—clearly much faster than a human performing a search, analyzing the search results and then typing a result to be displayed on a screen.

In some embodiments, fewer or more steps are implemented. Furthermore, in some embodiments, the order of the steps is modified. In some embodiments, the steps are performed on the same device, and in some embodiments, one or more of the steps, or parts of the steps, are separately performed and/or performed on separate devices. In some embodiments, each of the steps 100, 102, 104 and 106 occur or are able to occur in real-time or non-real-time. Any combination of real-time and non-real-time steps is possible such as all real-time, none real-time and everything in between.

Figure 2:
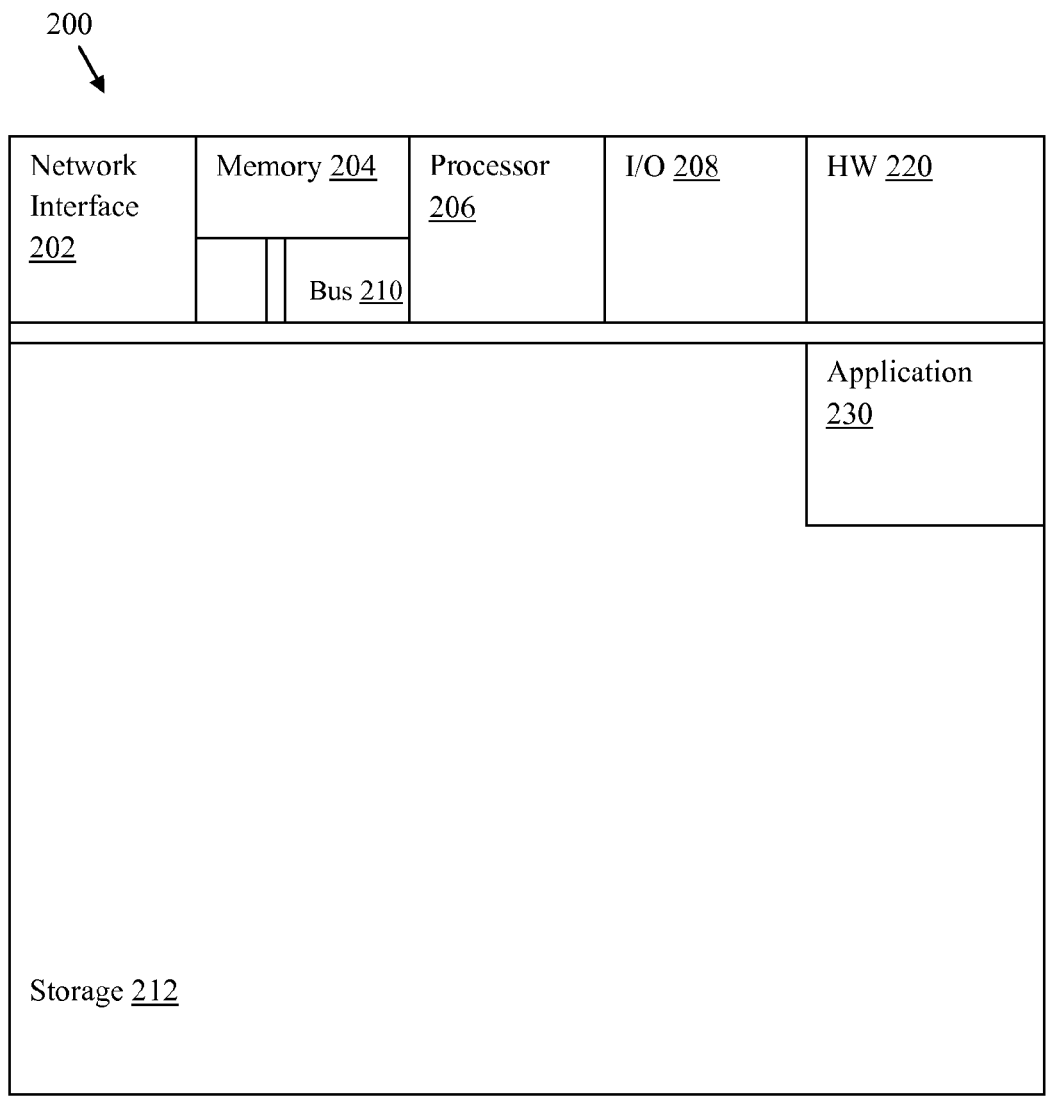
FIG. 2 illustrates a block diagram of an exemplary computing device configured to implement the efficient fact checking method according to some embodiments.

FIG. 2 illustrates a block diagram of an exemplary computing device 200 configured to implement the efficient fact checking method according to some embodiments. The computing device 200 is able to be used to acquire, store, compute, process, communicate and/or display information including, but not limited to, text, images, videos and audio. In some examples, the computing device 200 is able to be used to monitor information, process the information, fact check the information and/or provide a status of the information. In general, a hardware structure suitable for implementing the computing device 200 includes a network interface 202, a memory 204, a processor 206, I/O device(s) 208, a bus 210 and a storage device 212. The choice of processor is not critical as long as a suitable processor with sufficient speed is chosen. The memory 204 is able to be any conventional computer memory known in the art. The storage device 212 is able to include a hard drive, CDROM, CDRW, DVD, DVDRW, flash memory card, solid state drive or any other storage device. The computing device 200 is able to include one or more network interfaces 202. An example of a network interface includes a network card connected to an Ethernet or other type of LAN. The I/O device(s) 208 are able to include one or more of the following: keyboard, mouse, monitor, display, printer, modem, touchscreen, touchpad, speaker/microphone, voice input device, button interface, hand-waving, body-motion capture, touchless 3D input, joystick, remote control, brain-computer interface/direct neural interface/brain-machine interface, camera, and other devices. In some embodiments, the hardware structure includes multiple processors and other hardware to perform parallel processing. Fact checking application(s) 230 used to perform the monitoring, processing, fact checking and providing are likely to be stored in the storage device 212 and memory 204 and processed as applications are typically processed. More or fewer components shown in FIG. 2 are able to be included in the computing device 200. In some embodiments, fact checking hardware 220 is included. Although the computing device 200 in FIG. 2 includes applications 230 and hardware 220 for implementing the fact checking, the fact checking method is able to be implemented on a computing device in hardware, firmware, software or any combination thereof. For example, in some embodiments, the fact checking applications 230 are programmed in a memory and executed using a processor. In another example, in some embodiments, the fact checking hardware 220 is programmed hardware logic including gates specifically designed to implement the method.

In some embodiments, the fact checking application(s) 230 include several applications and/or modules. Modules include a monitoring module for monitoring information, a processing module for processing (e.g., converting) information, a fact checking module for fact checking information and a providing module for providing a status of the information. In some embodiments, modules include one or more sub-modules as well. In some embodiments, fewer or additional modules are able to be included. In some embodiments, the applications and/or the modules are located on different devices. For example, a device performs monitoring, processing, and fact checking, but the providing is performed on a different device, or in another example, the monitoring and processing occurs on a first device, the fact checking occurs on a second device and the providing occurs on a third device. Any configuration of where the applications/modules are located is able to be implemented such that the fact checking system is executed.

Examples of suitable computing devices include, but are not limited to a personal computer, a laptop computer, a computer workstation, a server, a mainframe computer, a handheld computer, a personal digital assistant, a pager, a telephone, a fax machine, a cellular/mobile telephone, a smart appliance, a gaming console, a digital camera, a digital camcorder, a camera phone, a smart phone/device (e.g., a Droid® or an iPhone®), a portable music player (e.g., an iPod®), a tablet (e.g., an iPad®), a video player, an e-reader (e.g., Kindle™), a DVD writer/player, an HD (e.g., Blu-ray®) or ultra high density writer/player, a television, a copy machine, a scanner, a car stereo, a stereo, a satellite, a DVR (e.g., TiVo®), a smart watch/jewelry, smart devices, a home entertainment system or any other suitable computing device.

Figure 3:
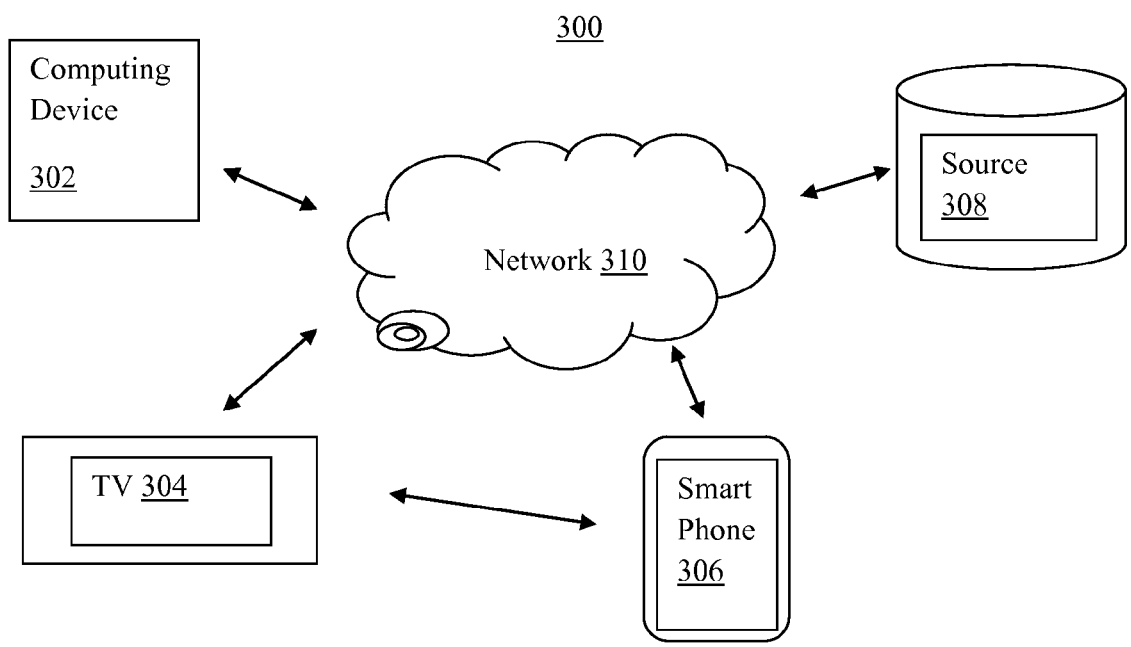
FIG. 3 illustrates a network of devices configured to implement fact checking according to some embodiments.

FIG. 3 illustrates a network of devices configured to implement fact checking according to some embodiments. The network of devices 300 is able to include any number of devices and any various devices including, but not limited to, a computing device (e.g., a tablet) 302, a television 304, a smart device 306 (e.g., a smart phone) and a source 308 (e.g., a database) coupled through a network 310 (e.g., the Internet). The source device 308 is able to be any device containing source information including, but not limited to, a searchable database, web pages, transcripts, statistics, historical information, or any other information or device that provides information. The network 310 is able to any network or networks including, but not limited to, the Internet, an intranet, a LAN/WAN/MAN, wireless, wired, Ethernet, satellite, a combination of networks, or any other implementation of communicating. The devices are able to communicate with each other through the network 310 or directly to each other. One or more of the devices is able to be an end user device, a media organization, a company and/or another entity. In some embodiments, peer-to-peer sourcing is implemented. For example, the source of the data to be compared with is not on a centralized source but is found on peer sources.

Figure 4:
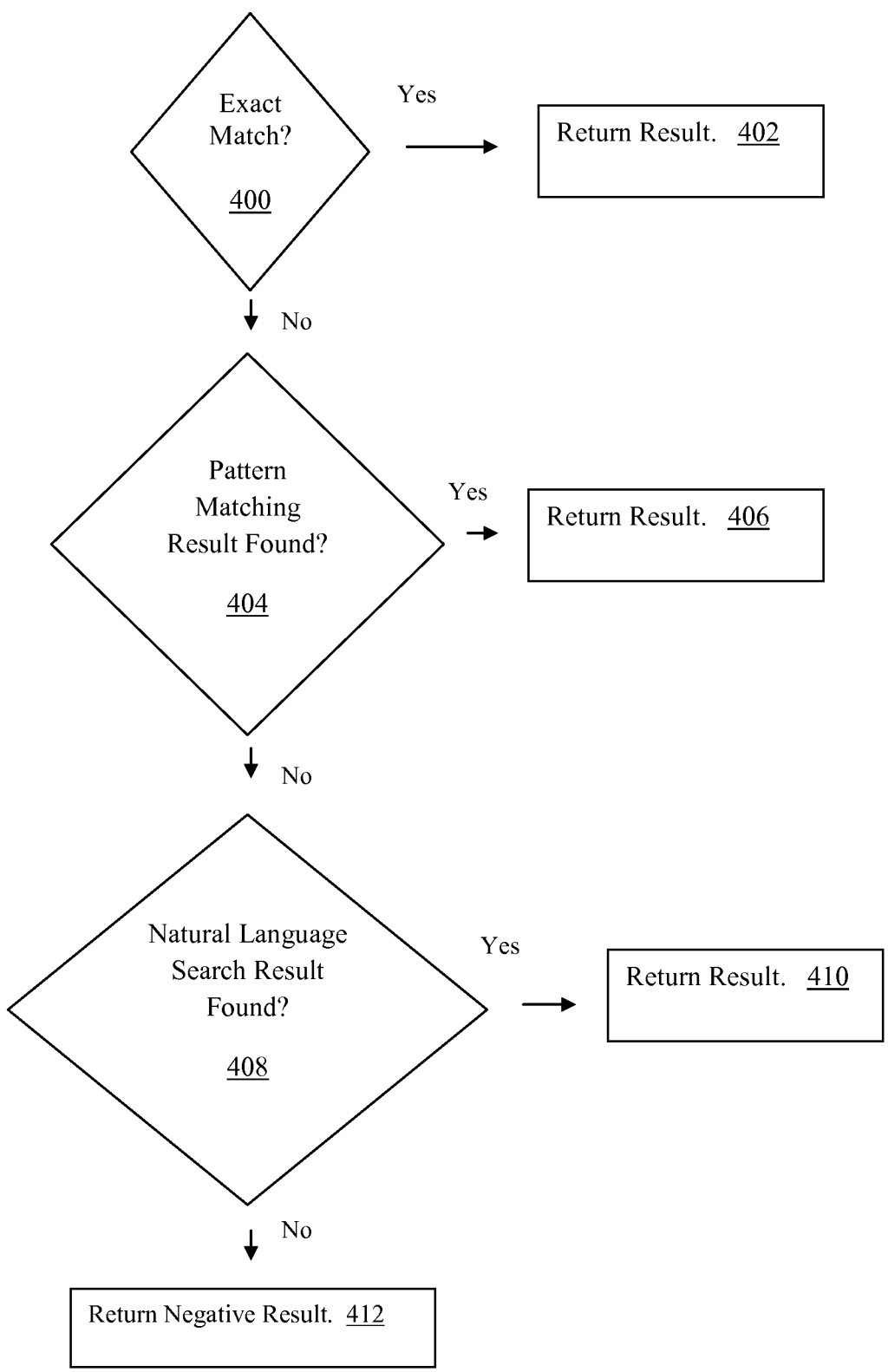
FIG. 4 illustrates a flowchart of a method of implementing efficient fact checking using a broadening implementation approach according to some embodiments.

FIG. 4 illustrates a flowchart of a method of implementing efficient fact checking using a broadening implementation approach according to some embodiments. In some embodiments, the step 104 of fact checking utilizes a broadening implementation approach. In the step 400, an exact match fact check is implemented. For example, the phrase "the President lied about taxes going up" has been parsed out for fact checking. In the step 400, that exact phrase is searched for within source information. If the exact phrase is found in a sufficient number of sources (e.g., above a lower threshold), then a result is returned (e.g., true), in the step 402. If the exact phrase is not found (e.g., equal to or below the lower threshold of sources), then a second fact check implementation is utilized, in the step 404. For example, the second fact check implements a pattern matching search. The pattern matching search is able to be implemented in any manner, for example, pattern matching utilizes subject-verb-object matching to determine if the same or a similar item matches. Any type of pattern matching is able to be implemented. If the second fact check returns with sufficient confidence (e.g., number of matches and/or sources above a lower threshold or a pattern matching confidence score above a lower threshold), then a result is returned, in the step 406. If the second fact check does not return with sufficient confidence, then a third fact check is implemented, in the step 408. For example, the third fact check implements a natural language search. If the third fact check returns with sufficient confidence (e.g., above a natural language confidence lower threshold or number of matches above a lower threshold), then a result is returned, in the step 410. If the third fact check does not return with sufficient confidence, then a negative result or some other result is returned, or no result is returned, in the step 412. For example, a negative result indicates that "the fact check did not find any support" or "fact unverified" or any other result to indicate that the fact check did not determine a result. In some embodiments, an indication of which fact check search returned the result is provided. For example, if an exact match was not found, but pattern matching provided a satisfactory result, then "no exact match, but result by pattern matching" is indicated. Although only three fact check implementations are described herein, any number of implementations are able to be implemented and used before returning a negative result. In some embodiments, the subsequent fact check is broader in scope than the previous fact check. For example, searching for an exact phrase is considered to be very narrow, and pattern matching allows for a larger number of potential matches to be found, and a natural language search allows for an even larger number of potential matches to be found. Depending on the implementation, pattern matching could be broader or narrower than a natural language search; thus, the order of the implementations could be modified. In some embodiments, the different searches are performed sequentially (e.g., first exact match, then pattern matching only if exact match did not return a result, and so on). In some embodiments, the different searches are run in parallel but a broader search result is only used if a narrower search does not return a result (e.g., only use pattern matching result if exact match does not return a result). In some embodiments, both (or more) results are used/presented. In some embodiments, the exact phrases to be compared with are only fact-based phrases or only opinion-based phrases, and in some embodiments, the phrases are fact-based phrases and opinion-based phrases.

Figure 5:
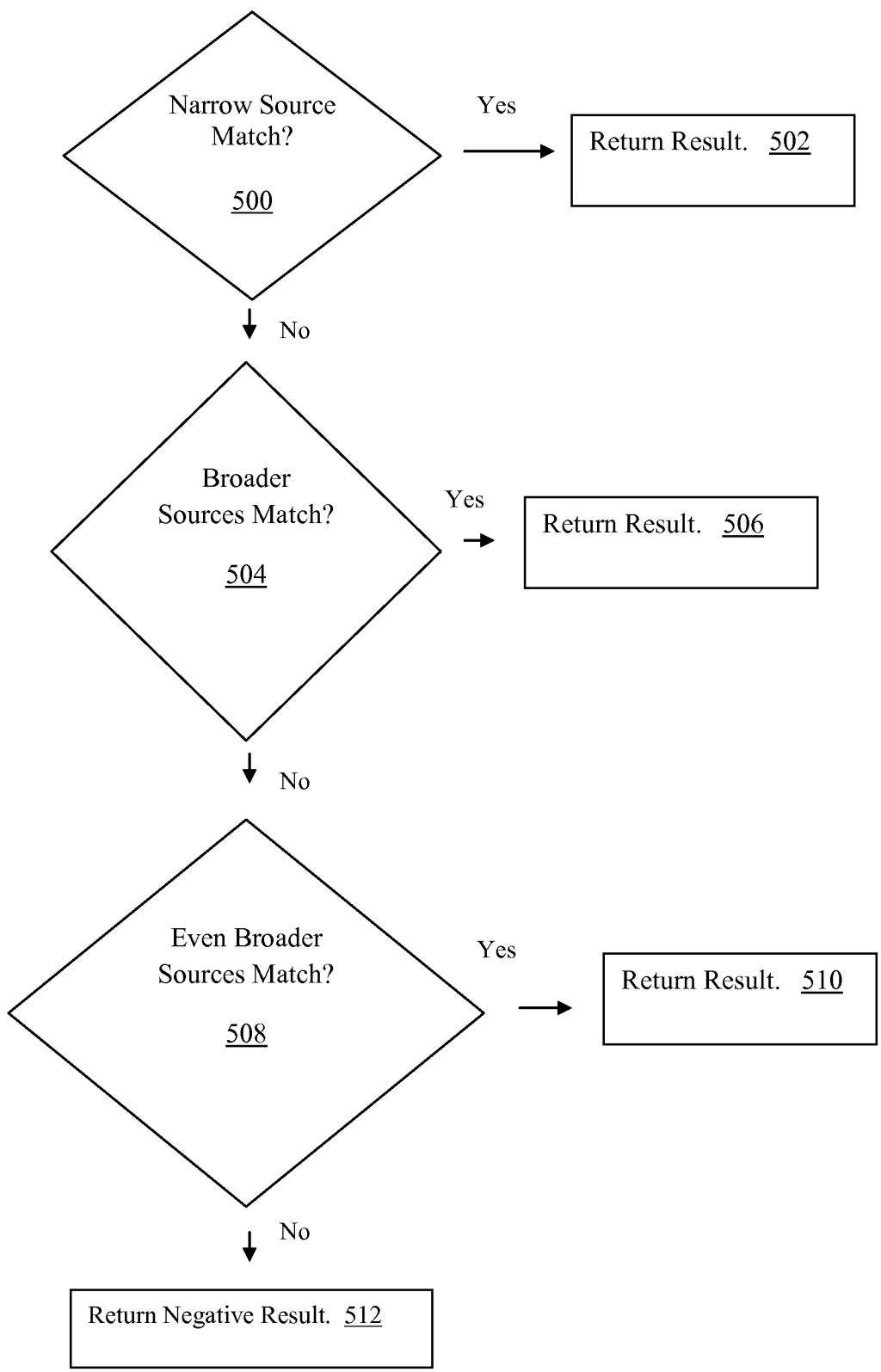
FIG. 5 illustrates a flowchart of a method of implementing efficient fact checking using a broadening source approach according to some embodiments.

FIG. 5 illustrates a flowchart of a method of implementing efficient fact checking using a broadening source approach according to some embodiments. In some embodiments, the step 104 of fact checking utilizes a broadening source approach. In the step 500, information to be fact checked is compared with a narrow source. For example, the narrow source is a single database stored on a local device. Other examples of narrow sources are a single document, a single document on a local device, a designated fact checking database or a single web page. If the fact check determines a sufficient result (e.g., information matches or is verified by the narrow source), then a result is returned (e.g., validated), in the step 502. If the fact check does not find a match, then a broader scope of sources is utilized (e.g., many databases stored within a dedicated set of "cloud" devices), in the step 504. If a sufficient result is determined (e.g., a number above a lower threshold of sources agree or disagree with the information to be fact checked), then a result is returned, in the step 506. If the broader fact check does not find a match, then an even broader scope of sources is utilized (e.g., the entire Web), in the step 508. If a sufficient result is determined (e.g., a number above a lower threshold of sources agree or disagree with the information to be fact checked), then a result is returned, in the step 510. If the even broader fact check does not find a match, then a result indicating a negative result, some other result, or no result is indicated, in the step 512. In some embodiments, additional broadening is implemented. In other words, the fact checking is not limited to three rounds of sources. In some embodiments, the efficient fact checking utilizes pipelining. In some embodiments, the different searches are performed sequentially. In some embodiments, the different searches are run in parallel but a broader search result is only used if a narrower search does not return a result. In some embodiments, the narrowest source is a fact checked database, a broader source is a broader fact checked database, and an even broader source is fact checked web sites. In some embodiments, a narrow source is a fact checked source, a broader source is a partially fact checked source (e.g., some of the source has been fact checked), and an even broader source is a non-fact checked source. In some embodiments, multiple results are returned (e.g., narrow and broad).

Although specific sources have been described, any narrowing/broadening is able to be implemented. In some embodiments, "narrow" is determined based on size or number. For example, a database with 10 entries is narrower than a database with 1000 entries. In another example, a single database regardless of size of the database is narrower than 1000 databases. In some embodiments, the narrow source or sources includes sources that have been fact checked, and broader sources have not been fact checked.

In another example of narrow/broad sources, a narrow source is a source controlled by a media or technology company, and if a result is not determined using that source, crowdsourced data is used, and if a result is not determined using the crowdsourced data, then the Web is used for fact checking.

In some embodiments, fact checking utilizes sources on devices of differing speeds. For example, source information on a local cache is used first, then source information on a Random Access Memory (RAM) is used, then source information on a hard drive is used, and then source information on distributed storage is used last for fact checking. In this example, quicker (meaning faster access times) sources are used first, followed by slower sources if a result is not found. In some embodiments, most recent, most popular, and/or most common quotes/information are stored in the quicker storage (e.g., cache), and the least recent, least popular, least common quotes/information are stored in the slower storage (e.g., distributed storage). In some embodiments, common variants of recent, popular, and/or common information are stored (locally) as well. For example, a similar comment with one or two of the words changed or replaced by synonyms. In some embodiments, the fact checking using the different sources is performed sequentially. In some embodiments, the fact checking using the different sources is performed in parallel. In some embodiments, only facts are stored in the cache or in devices faster than a hard drive (e.g., cache and RAM). In some embodiments, only facts are stored on faster devices (e.g., a hard drive or faster) and only opinions are stored on slower devices (e.g., distributed source devices). In some embodiments, higher confidence score fact check results are stored on devices with faster access times. For example, if a cache is able to store 1,000 fact check results, the 1,000 fact check results with the highest confidence score are stored in the cache, and the next highest fact check results are stored on RAM, and so on with the lowest confidence score results stored on the slowest devices. In another example, the storage includes varying speeds of servers, hard drives, locations on hard drives, and other data storage devices. For example, the most popular or relevant sources are stored on an extremely fast server, and less popular/relevant sources are stored on a slower server, and even less popular/relevant sources are stored on an even slower server.

Figure 6:
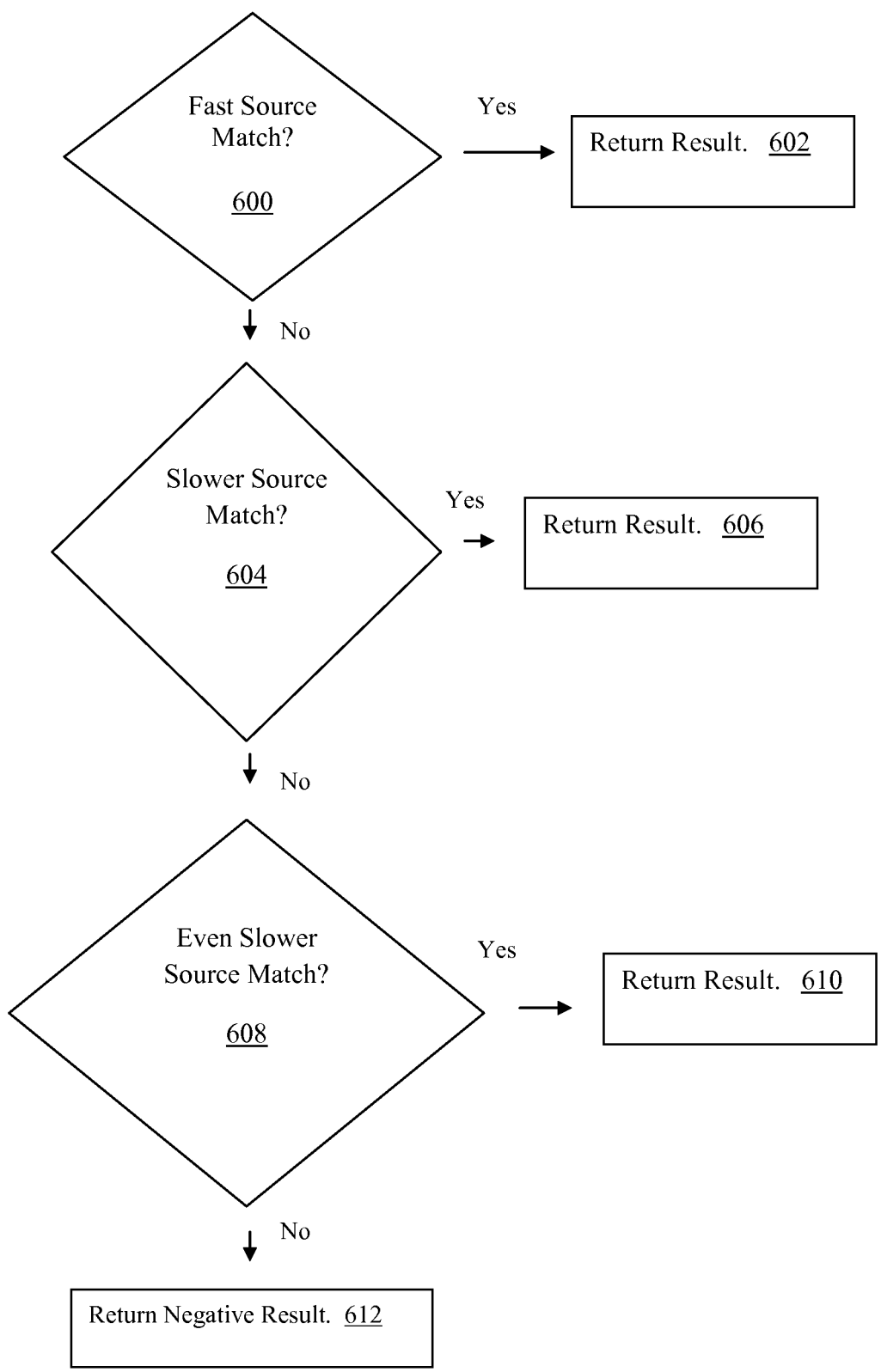
FIG. 6 illustrates a flowchart of a flowchart of a method of implementing efficient fact checking using faster access devices according to some embodiments.

FIG. 6 illustrates a flowchart of a flowchart of a method of implementing efficient fact checking using faster access devices according to some embodiments. In some embodiments, the step 104 of fact checking utilizes a faster access approach. In the step 600, information to be fact checked is compared with source information on a fast access device. For example, the source information is stored on a cache (which has faster access times than RAM or a hard drive) or on a faster server than other servers. If the fact check determines a sufficient result (e.g., information matches or is verified by the source on the fast access device), then a result is returned (e.g., validated), in the step 602. If the fact check does not find a match, then a source on a slower device (e.g., RAM is slower than cache or a second server is slower than the fast server) is utilized, in the step 604. If a sufficient result is determined (e.g., a number above a lower threshold of sources agree or disagree with the information to be fact checked), then a result is returned, in the step 606. If the slower source fact check does not find a match, then an even slower source device is utilized (e.g., hard drive has a slower access time than RAM or third server is slower than second server), in the step 608. If a sufficient result is determined (e.g., a number above a lower threshold of sources agree or disagree with the information to be fact checked), then a result is returned, in the step 610. If the even slower fact check does not find a match, then a result indicating a negative result, some other result, or no result is indicated, in the step 612. In some embodiments, additional slower sources are implemented. In other words, the fact checking is not limited to three rounds of sources. In some embodiments, the efficient fact checking utilizes pipelining. In some embodiments, the different searches are performed sequentially. In some embodiments, the different searches are run in parallel but a slower search result is only used if a narrower search does not return a result. In some embodiments, multiple results are returned (e.g., fast and slower).

Figure 7:
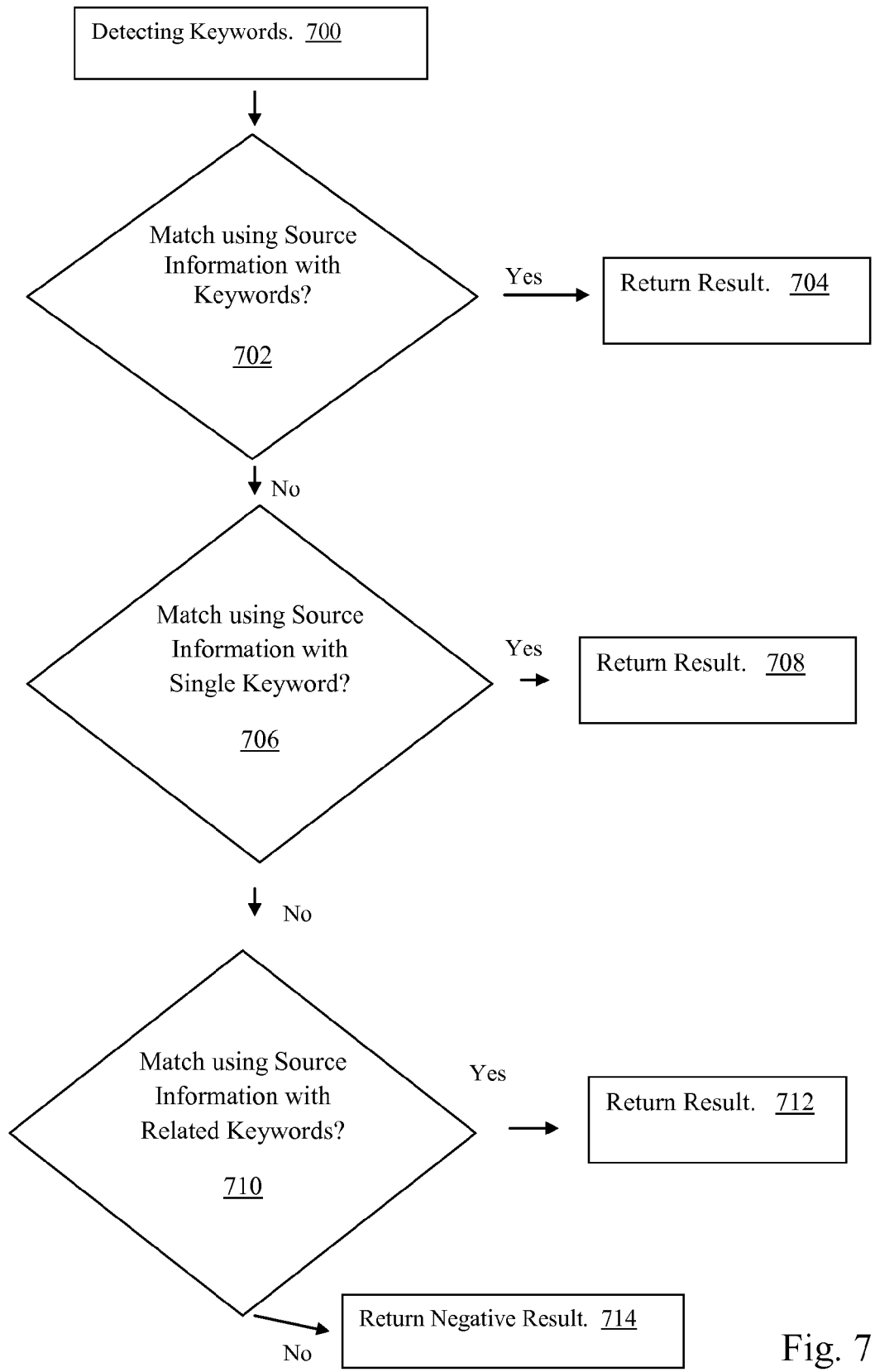
FIG. 7 illustrates a flowchart of a method of implementing efficient fact checking using a keyword-based source approach according to some embodiments.

FIG. 7 illustrates a flowchart of a method of implementing efficient fact checking using a keyword-based source approach according to some embodiments. In the step 700, a keyword or keywords (or phrases) are detected in the information. For example, it is detected that a commentator is discussing "global warming" and "taxes." In the step 702, only source information classified by the keywords "global warming" and "taxes" are utilized for fact checking. Instead of looking at all sources to confirm any information, the source information utilized is found in source information classified as related to "global warming" and "taxes." If the comparison using the source information in the step 702 produces a sufficient result, then the result is returned in the step 704, and the process ends. If the comparison does not produce a result, then, in the step 706, the comparison uses broader sources such as sources that are related to only a single keyword such as "taxes." If that comparison returns a sufficient result, in the step 708, then the process ends. If further comparisons are needed, then the scope of source information broadens again, in the step 710, and sources classified with keywords related to keywords found in the information are used. For example, instead of just using "taxes" and "global warming," sources under classifications of: "economics," "finance," and "weather" are utilized. If a result is found, then the result is returned, in the step 712. In some embodiments, if a result is still not found, the process ends, with a negative result or no result returned, in the step 714, and in some embodiments, further expansion of the sources is implemented. In some embodiments, fewer or additional steps are implemented. In an example, sources are classified as global warming→NJ→2014, then global warming→NJ, and global warming as the broadest of the three. In some embodiments, the fact checking using the different sources is performed sequentially. In some embodiments, the fact checking using the different sources is performed in parallel. In some embodiments, the keywords are determined based on previous fact check results. In some embodiments, the keywords are fact-based keywords.

In some embodiments, source information is narrowed by detecting topics/keywords or other information. For example, if the topic of "global warming" is detected, then only sources that discuss or are classified as relating to "global warming" are used. Further, if "global warming" and "Hawaii" are discussed, then the source information is narrowed further to sources that discuss "global warming" and "Hawaii." In some embodiments, the information is continuously analyzed for keywords to determine which sources to utilize. In some embodiments, after the narrow search is utilized, if satisfactory results are not determined, then the search expands and progressively uses broader searches (e.g., sources not discussing "global warming" but discussing a related subject such as "weather").

In some embodiments, the efficient fact checking implementations of FIGS. 4, 5, 6 and 7 and/or other implementations are utilized together. For example, an exact match search is implemented on a local cache using only keyword-classified source information before any other comparisons are performed, and the comparisons broaden/narrow from there. Additional examples include: exact match on cache, then exact match on RAM, exact match on hard drive, exact match on other locations, then pattern matching on cache, pattern matching on RAM, pattern matching on other locations, then natural language search on cache, natural language search on RAM, and natural language search on other locations. In another example, an exact match on cache is used first, then a pattern match on cache, then a natural language search on cache, then an exact match on RAM, and so on. Any combination of the efficient searches/fact checking is possible. In some embodiments, the fact checking process continues until a result is found or a timeout is determined (e.g., after 0.5 ms of searching and no result is determined, the process times out).

Figure 8:
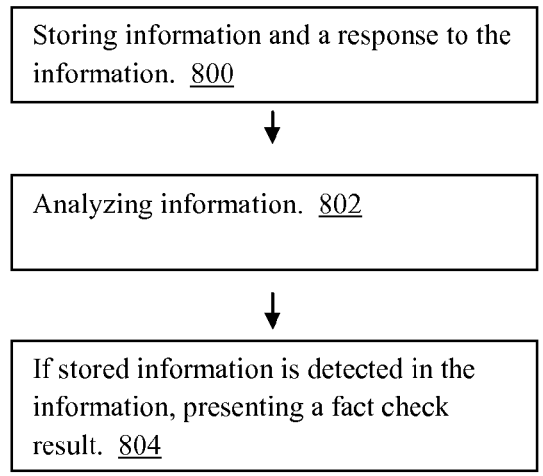
FIG. 8 illustrates a flowchart of a method of implementing reverse fact checking according to some embodiments.

FIG. 8 illustrates a flowchart of a method of implementing reverse fact checking according to some embodiments. In the step 800, phrases, quotes and/or other information/content are stored. For example, quotes are stored in a database. Additionally, a response corresponding to the information is stored. For example, the stored response is a fact check result or information disproving misinformation or confirming information. In the step 802, information is analyzed (e.g., monitored and/or processed). For example, broadcast information is monitored, converted, parsed, and compared with the stored information. In the step 804, if the stored information is detected, then the stored response is presented (e.g., displayed on the screen). In some embodiments, fewer or additional steps are implemented.

In some embodiments, reverse fact checking is implemented by storing phrases and/or quotes that are popular/commonly used but are incorrect (e.g., Obamacare has death panels). In some embodiments, determining which phrases/quotes to store is performed manually or automatically. For example, political analysts determine information worth storing. In another example, crowdsourcing is used in determining which information to store, such as users flagging the same content. In another example, if a quote is re-tweeted (or digitally quoted/resent) by a number of people above a lower threshold, then the information is stored. In addition to storing the phrases/quotes, a response is stored. Determining the response is able to be performed manually (e.g., by crowdsourcing) or automatically. In an example, if the quote stored is: "global warming is a hoax," an exemplary response is "actually 97% of scientists believe global warming is a significant man made problem." Modifications of the phrases/quotes are stored as well and are matched with the same response. For example, "global warming is a scam" is also stored. Instead of fact checking content, the set of phrases/quotes are monitored for, and if detected, the response is displayed. In some embodiments, the response includes highlighting the quote (e.g., turning it red), a text response, an audible alert, and/or any other effect.

Figure 9:
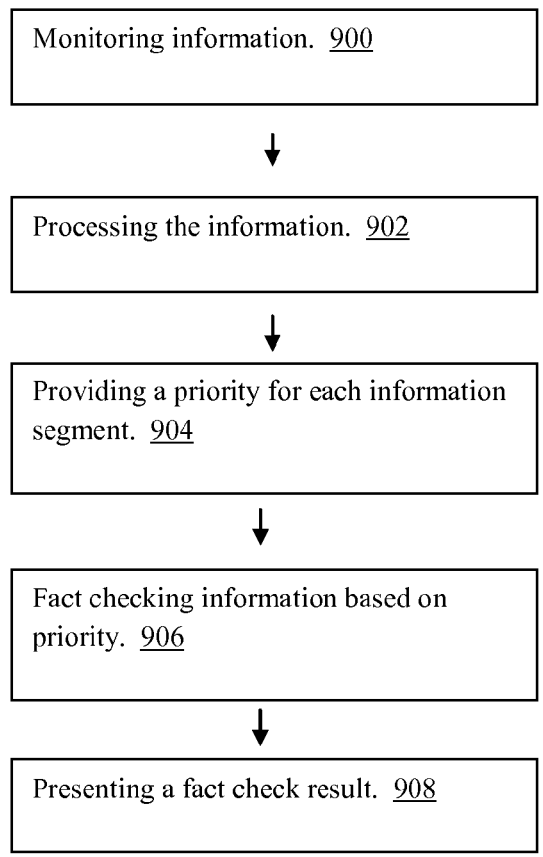
FIG. 9 illustrates a flowchart of a method of implementing priority-based fact checking according to some embodiments.

FIG. 9 illustrates a flowchart of a method of implementing priority-based fact checking according to some embodiments. In the step 900, information is monitored. In the step 902, information is processed (e.g., converted and parsed). In the step 904, information segments are given a priority. In the step 906, a highest priority information segment is fact checked and removed from the priority queue. In the step 908, the fact check result is presented. The process repeats such that the highest priority information segment remaining is fact checked and the result is presented, and the process continues until there are no segments to be fact checked. In some embodiments, fewer or additional steps are implemented.

In some embodiments, information and/or facts are prioritized, and the highest priority items are fact checked first with lower priority items fact checked later. In some embodiments, higher priority is given to information that is related to a specific topic (e.g., the topic being discussed) or based on a previously defined topic list which ranks importance. For example, it is determined the topic being discussed is "taxes" based on detected keywords, so a segment regarding "lowering taxes" is the same topic and is given a higher priority than a segment regarding "gun control" which is a different topic. In another example, a topic list could have taxes as a highest priority, followed by employment, followed by the environment, and so on until the lowest priority item. In some embodiments, user(s) are able to define/prioritize the topic list. In some embodiments, priority depends on the speaker. For example, a guest's comments are given higher priority than the host's comments or vice versa. In another example, a prioritized speaker list is utilized. For example, Host X and Host Y are in a highest priority grouping, Host Z is in a second highest priority grouping, and so on. In some embodiments, there is an "other" priority grouping for people not on the list by name. In some embodiments, the prioritized speaker list changes based on validity ratings. For example, if a speaker's validity rating is below a first threshold, then the speaker is in a highest priority group, and if the validity rating is below a second threshold but above the first, then he is in the second highest priority group and so on. Also, if a speaker's validity rating drops, then he goes up on the priority list to ensure his comments are fact checked, and vice versa, if a speaker's validity rating increases, then he goes down on the priority list. The validity rating is able to be based on fact checking results of comments made by an entity or any other information provided by the entity. For example, if a person makes factually accurate comments, then the user is given a 10 (on a scale of 1 to 10) for a validity rating. In another example, if a user makes many factually inaccurate comments, the user may receive a 2 out of 10 for a validity rating. Other factors are able to be used in determining a validity rating such as severity of the inaccuracy, the subject/topic of the misinformation, hypocrisy and/or controversies. In some embodiments, users are able to select a priority for a speaker/entity. In some embodiments, by prioritizing information, the fact checking results are able to be better presented in real-time. In some embodiments, content that is a lower priority and does not meet a timeout threshold is not fact checked. For example, a comment is viewed as a low priority and 3 seconds have passed without obtaining a fact check result, so the comment is deleted from a fact check queue. Priority is able to be based on time, speaker/entity, classification, and/or any other factor. For example, an older segment with the same classification has a higher priority than a newer segment. In another example, a segment in a higher priority classification is given a higher priority than an older, lower priority classification. In some embodiments, two (or more) separate queues are implemented, with the first queue being segments above a priority threshold and the second queue being segments below a priority threshold. The segments in the first queue are fact checked in real-time, and the segments in the second queue are not fact checked in real-time. For example, the segments in the second queue are fact checked but the results are provided in the background or at the end of a show or some other feature that does not disrupt the live show. In some embodiments, the separate queues are fact checked in parallel.

Figure 10:
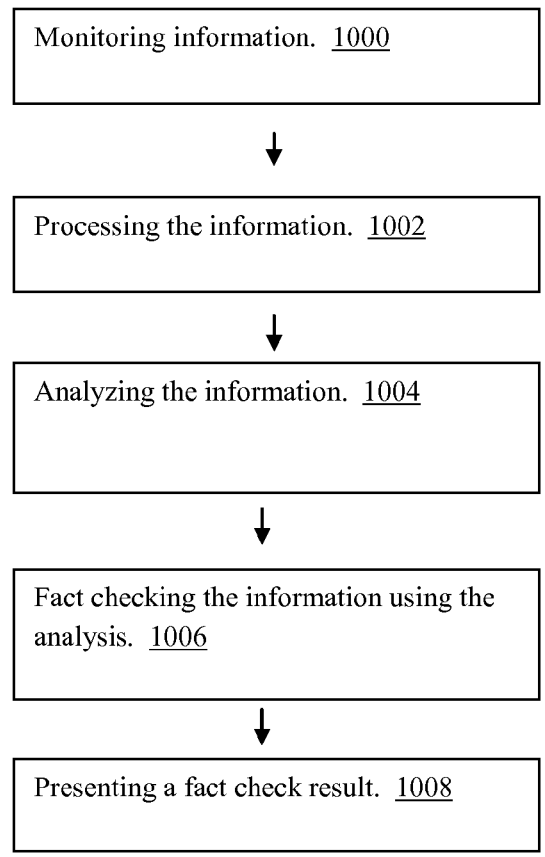
FIG. 10 illustrates a flowchart of a method of fact checking by separation according to some embodiments.

FIG. 10 illustrates a flowchart of a method of fact checking by separation according to some embodiments. In the step 1000, information is monitored. In the step 1002, the information is processed. For example, the information is separated into sentences (or phrases or segments), and the sentences are separated into words. In the step 1004, the processed information is analyzed. For example, the number of words in the sentence are counted. In the step 1006, the processed information is fact checked using the analysis. In the step 1008, the fact check result is presented. In some embodiments, additional or fewer steps are implemented.

In some embodiments, fact checking is implemented by separating content into sentences or phrases, separating the sentences into words, and counting the number of words in the sentence. Then, each word is compared with source information, and the source information specifically includes sentences that contain the same number of words as the sentence being fact checked. For example, if a sentence has 6 words, then the words are compared with 6-word phrases in sources. If 1 word matches of the 6 words, then the match is poor. If all 6 words match, then the match is close. In some embodiments, then the order of the words is analyzed. If the order of the words is the same, then the match is exact. In some embodiments, specific differences are searched for such as "not" or other negative words. In some embodiments, the information is compared with a slightly longer phrase, and a negative word is searched for. For example, if a sentence is 6 words long, then it is compared with sentences of 7 words long including the word "not" or another negative. In some embodiments, each word is put into a data structure including the order of the words, and the data structure is compared with similar source data structures. In some embodiments, this implementation is utilized with classifications of sources to narrow the comparisons. For example, instead of comparing a 6-word sentence with all 6-word sentences, it is detected that the 6-word sentence includes the words "global" and "warming," so only sentences classified under "global warming" are used as source information. In some embodiments, this implementation is used with other efficiency improvements; for example, storing some source information on a cache, RAM, and so on, or the other efficiency improvements are implemented without utilizing the classified source information implementation.

In some embodiments, the efficient fact checking system separates content into fact-based information and other information such as opinions or other commentary. After the fact-based information is separated out, then only that information is fact checked, and the other information is ignored. The fact-based information is able to be distinguished from the other information using any implementation such as based on the format of the information, detecting keywords, and any other implementation. For example, if the key phrase, "in my opinion" is detected, then the rest of the sentence until a stop is determined is viewed as not fact-based.

Figure 11:
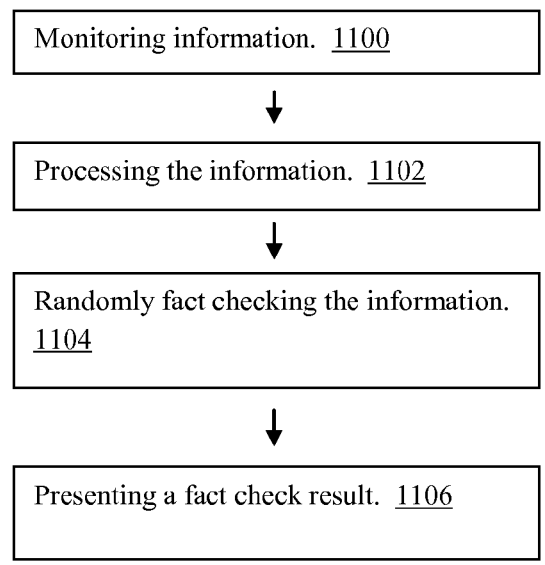
FIG. 11 illustrates a flowchart of a method of implementing a random fact checking system such that not all content is fact checked according to some embodiments.

FIG. 11 illustrates a flowchart of a method of implementing a random fact checking system such that not all content is fact checked according to some embodiments. In the step 1100, information is monitored. In the step 1102, the information is processed. In the step 1104, random fact checking is implemented, and results are presented. The fact checking is able to be randomized in any manner. For example, if the information is parsed into 10 segments, 3 of the 10 segments are automatically chosen at random to be fact checked. In another example, every other segment is fact checked. In another example, fact checking occurs every 15 seconds, such that any segments parsed before the 15 second period are discarded/ignored. In the step 1106, the results of the random fact check are presented. In some embodiments, fewer or additional steps are implemented. In some embodiments, other aspects are randomized. For example, monitoring is randomized, such that random segments are monitored which are fact checked. Furthering the example, during a 30 minute program, monitoring only occurs for 30 seconds and then is turned off for 30 seconds. In another example, processing is randomized such that all information may be monitored but only random segments are processed and fact checked. In some embodiments, random monitoring, processing and fact checking are utilized together. For example, only random segments are monitored, and of those randomly monitored segments, only random segments are processed, and of those randomly processed segments, only random processed segments are fact checked.

In some embodiments, segments (after processing information) with a length greater than or less than a threshold are fact checked. For example, segments are determined as described herein, and words are counted. Furthering the example, only information segments that have more than 10 words are fact checked. In another example, only information segments that have 5 words or fewer are fact checked.

In some embodiments, the efficient fact checking implementations described herein are utilized together according to some embodiments. For example, content is classified, content is separated into facts and other items, and only facts are fact checked, content and speakers are prioritized, so that only the highest priority content is fact checked, and efficient use of source information is utilized including the software and hardware implementations described herein.

In some embodiments, multiple fact checking implementations are utilized initially, and then the best fact checking implementation is selected. The multiple fact checking implementations are able to be different in any manner such as using different sources, using different source determination methods, using different source weighting/selection methods, using different searching methods, using different comparison/result determination methods, using different parsing/processing implementations, using different monitoring implementations (e.g., standard, random), and/or any other possible differences in fact checking. The best fact checking implementation is able to be determined based on the accuracy of the results and/or the speed of the results of each implementation. In some embodiments, the best fact checking implementation is determined by iteratively narrowing the possible implementations by eliminating one or more implementations after each iteration until only one remains (e.g., eliminating the slowest and/or least accurate implementation). For example, five segments are parsed out of information, and five different fact checking implementations are used to fact check the segments. Then, the results of each are compared manually or automatically (e.g., compare confidence %). Then, the worst (e.g., lowest confidence) fact checking implementation is removed. The process repeats until only one implementation remains. In another example, all fact checking implementations with a confidence score below a lower threshold are removed. In some embodiments, the process of determining a best fact checking implementation starts over for each new content (e.g., new video, new show, new channel). In some embodiments, the best fact checking implementation is stored and used for the same program, channel, or similar content (e.g., same format such as a news program or same host). For example, after the best fact checking implementation is determined for a 1 hour news show on CNN, then that implementation is used for that show (and, in some embodiments, for future occurrences of that show and/or other news shows). For example, shows, web sites, social media content and/or any other content is classified, and a best fact checking implementation is determined and used for each classification. In some embodiments, the process of determining a best implementation occurs very quickly, for example, within the first minute of a program. In some embodiments, the process of determining a best implementation occurs in parallel while using a previously determined best implementation to fact check the current information. In some embodiments, the process of determining a best implementation occurs in a prior program. In some embodiments, a competitive best fact checking implementation is utilized such that the implementations are narrowed to the best two, and the best two are continuously used, and then the results of the best two are used or compared to determine an ultimate result. In some embodiments, the best fact check implementations are determined for different genres (e.g., sports, politics, economics). In some embodiments, the best fact checking implementations are determined for channels/networks. In some embodiments, the best fact checking implementations are determined for types of content (e.g., news versus opinion or tweets versus webpages). In some embodiments, one or more of the best fact checking implementations are stored, so that, for example, when a user changes channels, the best fact checking implementation for that channel is able to be used. In some embodiments, several best fact checking implementations are determined and displayed for users to select and use. In some embodiments, the determination of a best fact checking implementation is performed constantly or periodically (e.g., hourly, daily, monthly). In some embodiments, if a fact checking implementation returns results below a threshold, then that implementation is not used again (e.g., not even for comparison purposes). For example, if an implementation performs so poorly that it does not meet a minimum threshold, that implementation is removed from a database or queue of implementation to compare. In some embodiments, users are able to generate a fact checking implementation to compete for the best implementation. For example, users are able to select sources, exclude sources, provide specific weights for sources, and/or any other modification to an implementation, and then use that implementation to compare with other fact checking implementations. In some embodiments, after a best fact checking implementation is determined, minor modifications of that best fact checking implementation are compared with the best fact checking implementation to determine if there is a better fact checking implementation. For example, a best fact checking implementation is determined. Then, that best fact checking implementation is compared with the same best fact checking implementation with a modification of using 10 fewer sources. It is then determined which is the best of those two. In some embodiments, the best fact checking implementation is determined using past information (e.g., yesterday's show), so that the best implementation is available immediately at the beginning of today's show.

Figure 12:
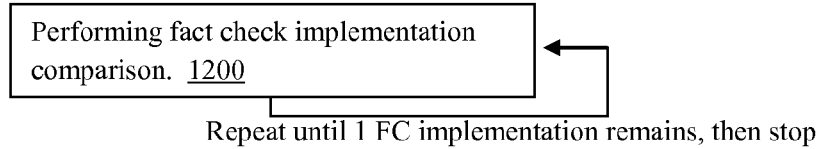
FIG. 12 illustrates a flowchart of a method of fact checking by elimination according to some embodiments.

FIG. 12 illustrates a flowchart of a method of fact checking by elimination according to some embodiments. In the step 1200, a fact check implementation comparison occurs. The process repeats until a single fact check implementation remains. In some embodiments, fewer or additional steps are implemented.

Hardware

In some embodiments, fact checking is implemented utilizing a bendable/flexible screen. For example, a video or text is displayed on a screen, and the device (e.g., smart phone) detects the user bending the screen (e.g., based on a change in pressure or shape), then the device fact checks what was on the screen when the screen was bent. A fact check result is then displayed. In some embodiments, the device takes a snapshot of the screen upon detecting the screen bending, converts the captured image to text, and then performs fact checking. In some embodiments, a user is watching a video on his smart device, and upon screen bending detection, the video is determined (e.g., by analyzing the url of the video), and then fact check information is retrieved from the cloud for that specified video and displayed on the device. In some embodiments, the curvature of the bendable screen is used to hide false information. For example, truthful information is displayed properly, but text that is false or misleading is either hidden by the curve of the screen or is not clear because of the curve of the screen. In some embodiments, users are able to flag content as questionable or another characterization by bending the screen. For example, a user is watching a video on his bendable mobile device, and hears something that he does not think is accurate. The user bends the screen, which causes a clip (including, for example, 20 seconds of the video before/after the bend), text, and/or, identification information to be sent to the cloud to be fact checked, or to be stored, and if a sufficient number of users (e.g., above a threshold) indicate an item is questionable, then the item is fact checked.

Figure 13:
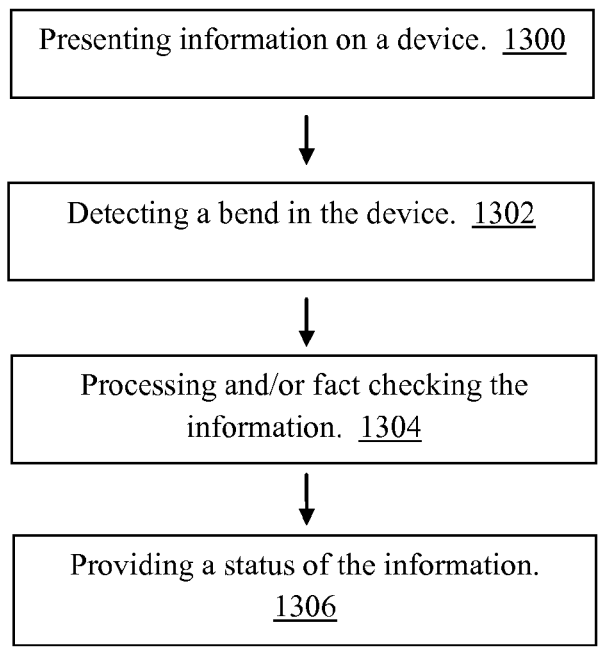
FIG. 13 illustrates a flowchart of a method of utilizing a bendable screen for fact checking according to some embodiments.

FIG. 13 illustrates a flowchart of a method of utilizing a bendable screen for fact checking according to some embodiments. In the step 1300, information is presented on a device (e.g., tablet, phone, watch) with a bendable screen. In the step 1302, a bend is detected in the device (e.g., detecting pressure from a user bending the device). In the step 1304, the device processes and/or fact checks the information on the screen. In some embodiments, fact checking includes sending the information or identification information to another device or devices (e.g., the cloud) and receiving a fact check result. In the step 1306, the fact check result is presented on the bendable screen. As described above, in some embodiments, the fact check result is displayed utilizing the bend of the screen. In some embodiments, a representation (e.g., an icon or picture) of an entity is displayed, and based on the fact checking results, the representation is moved closer and closer to the bend until the representation is blurred or hidden by the bend. For example, as misinformation is detected, the representation is moved closer to the bend, and after a threshold of misinformation is reached, the representation is obscured by the bend. In some embodiments, fewer or additional steps are implemented.

Figure 14:
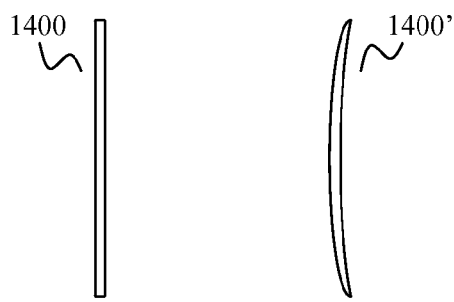
FIG. 14 illustrates an exemplary bendable device according to some embodiments.

FIG. 14 illustrates an exemplary bendable device according to some embodiments. The device 1400 is shown in a standard straight or unbent configuration. The device 1400' is shown in a bent configuration.

Figure 15:
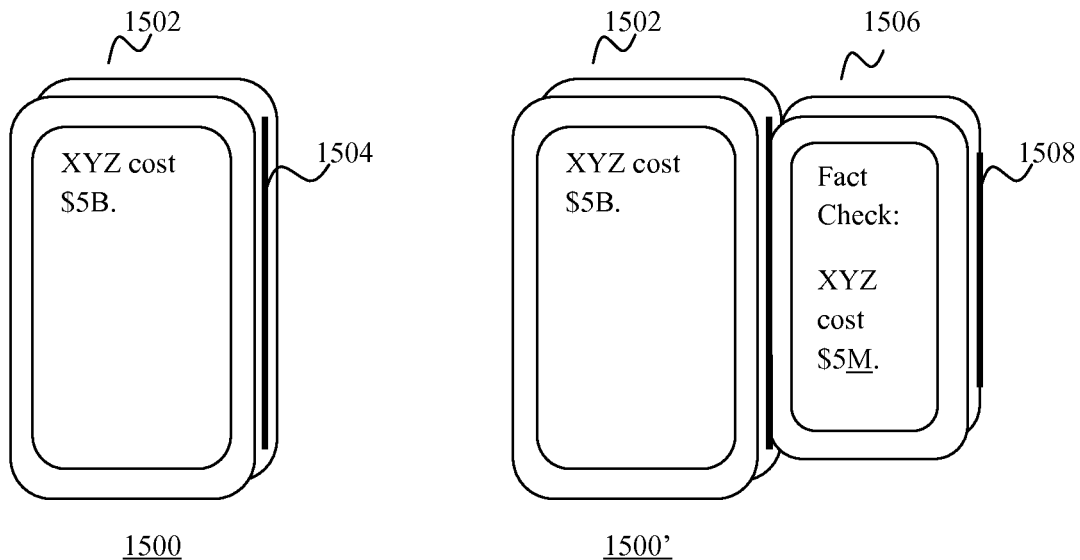
FIG. 15 illustrates a multi-tiered or nested smartphone or smart device according to some embodiments.
Figure 15:
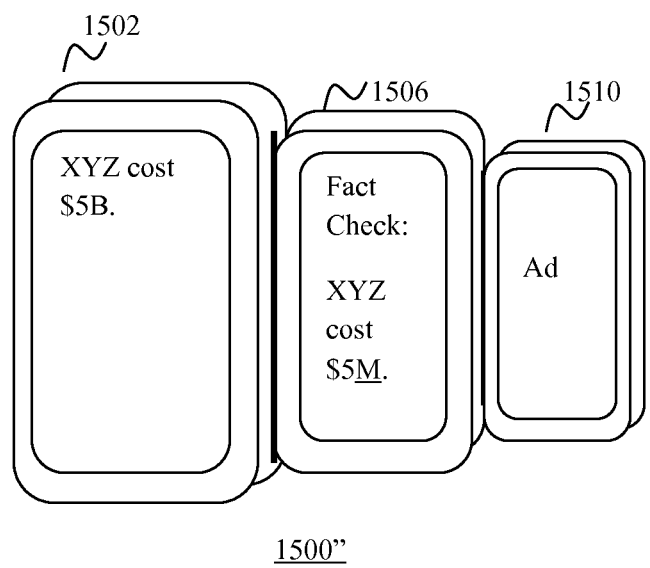

FIG. 15 illustrates a multi-tiered or nested smartphone or smart device according to some embodiments. The nested device shown in view 1500 appears the same as a standard smartphone. The nested device includes a main body 1502. The main body is similar to a standard smart phone and includes standard components such as a case, screen, memory, a processor, and any other smart phone components. The device is programmed (e.g., contains an application) for fact checking as described herein. The internal components such as the memory and processor are located such that there is a cavity 1504 within the main body 1502. For example, the memory and processor are positioned in the top or bottom of the main body 1502 above or below the cavity 1504. The cavity 1504 is capable of storing a second body/screen 1506 which is able to slide out of the main body 1502 in any manner. For example, the second body 1506 is on a track that enables the second body 1506 to slide out from the main body 1502. The slid out second body 1506 is shown in view 1500'. In some embodiments, the second body 1506 is completely removable from the main body 1502, and in some embodiments, the second body 1506 is not removable. The second body 1506 is configured similar to the main body 1502 in that it also includes a cavity 1508 which is capable of storing a third body 1510. Similar to the second body 1506, the third body 1510 is able to slide out of the second body 1506. The slid out third body 1510 is shown in view 1500". By using additional screens, in some embodiments, the main content (e.g., video or text) is able to be displayed on the main body 1502, and fact check results are able to be displayed on the second body 1506. In some embodiments, the main content is on the second body 1506, and the fact checking result is on the main body 1502. Additionally, advertisements related to the fact check result and/or the main content are able to be displayed on the third body 1510. Other information is able to be displayed on the third body 1510, such as past fact check information, validity rating information and/or other fact check information. In some embodiments, the nesting device includes only two bodies (a first body and a second body), and in some embodiments, the nesting device includes additional bodies. In some embodiments, users are able to move content among/between bodies (e.g., by swiping).

Figure 16:
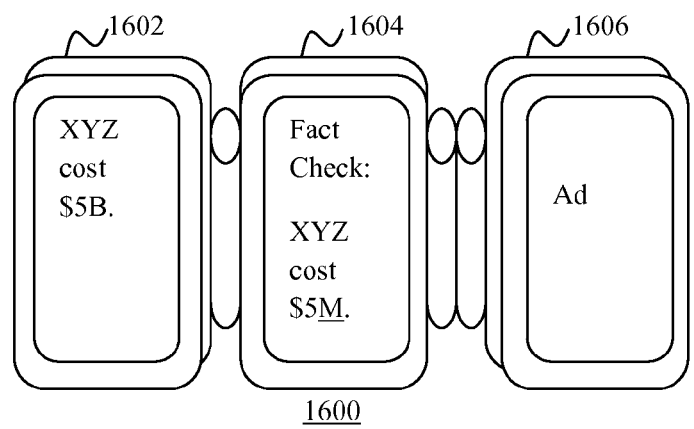
FIG. 16 illustrates a foldable/wallet smartphone which includes two or three screens according to some embodiments.
Figure 16:
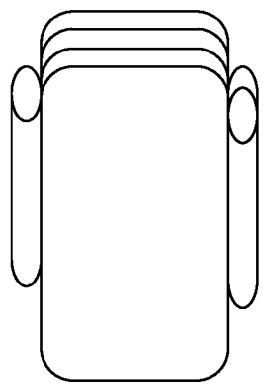

FIG. 16 illustrates a foldable/wallet smartphone which includes two or three screens according to some embodiments. The foldable/wallet smartphone is programmed (e.g., contains an application) for fact checking as described herein. The wallet smartphone shown in FIG. 16 includes 3 bodies, a first body 1602, a second body 1604, and a third body 1606. In the view 1600, the wallet smartphone is shown in an open configuration where all three screens are viewable. In some embodiments, in the first body 1602, main content is displayed, in the second body 1604, fact check results are displayed, and in the third body 1606, an advertisement or other information is displayed. In some embodiments, the bodies are coupled using hinges or another device that enables the wallet smartphone to close into a closed configuration as shown in view 1600'. The wallet smartphone is able to close similar to a tri-fold wallet. In some embodiments, the wallet smartphone closes so that all of the screens are on the inside for protection, and in some embodiments, the wallet smartphone closes so that one or two of the screens are on the outside for ease of use. In some embodiments, the hinges are able to be operated in either direction so that a user is able to choose the closed configuration. In some embodiments, users are able to move content among/between bodies (e.g., by swiping).

In some embodiments, the wallet smartphone is a bi-fold or clamshell configuration with two screens (one screen on one shell and a second screen on the second shell). The main content is able to be displayed on one screen and fact check information is able to be displayed on the second screen. In some embodiments, additional screens/bodies/folds are implemented.

In some embodiments, a cube-shaped smartphone is implemented for fact checking such that most or all of the sides are touchscreens. In some embodiments, the smartphone is a rectangular shape (similar to typical smartphone shapes) with most or all of the sides as touchscreens.

Figure 17:
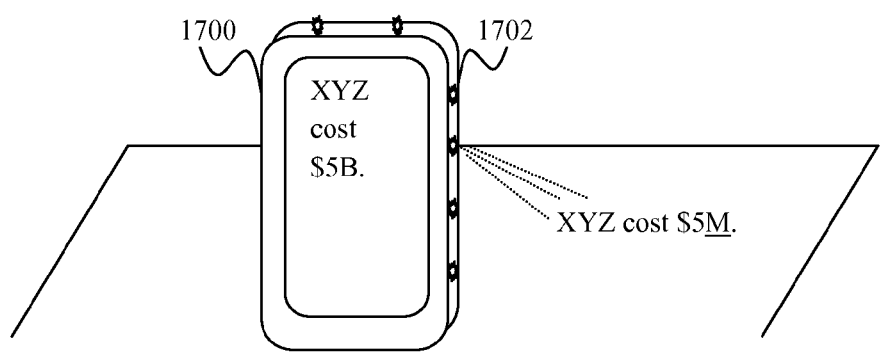
FIG. 17 illustrates a diagram of a smart device with multiple projectors around the edge of the device according to some embodiments.

FIG. 17 illustrates a diagram of a smart device with multiple projectors around the edge of the device according to some embodiments. The smart device includes a body 1700 and a plurality of projectors 1702 which are configured to project fact checking results on a nearby surface (e.g., surface below) such as a table top. In some embodiments, there is a single projector, and in some embodiments, there are multiple projectors. In some embodiments, one set of projectors (e.g., on a first side of the device) is for presenting a first type of fact check result (e.g., false information), and a second set of projectors (e.g., on a second side of the device) is for presenting a second type of fact check result (e.g., true information). The projectors are able to be any type of projector and are able to be located anywhere on/in the device.

FIG. 18 illustrates a side view of a mobile device configured for projecting fact checking results on the screen according to some embodiments. The device 1800 includes a projector 1802 (e.g., laser projector) for projecting fact check results onto the screen of the device 1800 or elsewhere.

FIG. 19 illustrates a front view of a mobile device configured for projecting fact checking results on the screen according to some embodiments. As shown, the text on the screen says "$5 B," but after a fact check is performed, the projector 1802 projects a correction of "$5 M" on the screen. The fact checking is able to be performed in any way. Then, the projector 1802 projects the result on the screen of the device 1800, so that it is easily determinable which information is a fact check result. The projector 1802 is able to be pivoted or moved, for example, from an open position to a closed position. Additionally, the projector is able to be configured to point elsewhere such as at a table, wall, or the user's hand.

Additional Implementations

FIG. 20 illustrates a flowchart of a method of utilizing multiple aspects for fact checking according to some embodiments. In the step 2000, body language of an entity is analyzed. In the step 2002, information from the entity is fact checked in conjunction with the analysis of the body language information. In the step 2004, the format of the information is analyzed. In the step 2006, a validity rating of the entity is analyzed. In the step 2008, a fact check result is presented based on the combination of the previous steps. In some embodiments, fewer or additional steps are implemented. For example, in some embodiments, the fact check result is based solely on the body language analysis without fact checking. Any combination of the steps 2000-2006 is able to be implemented, including using each step alone. The steps are able to be implemented in any order.

In some embodiments, multiple aspects of fact checking are utilized together for a more complete fact checking analysis. For example, the content or substance of information is fact checked as described herein. Additionally, the body language and speech of the entity is analyzed as described herein. The format of the information is also analyzed as described herein. Also, validity rating of the entity is able to be used in determining the validity of current information presented by the entity. Then, all of this information/analysis is utilized to generate a final fact check result. For example, the content fact check returns a result of a 75% chance of what the entity just said is misleading. Body language analysis and speech analysis detected that the user is likely providing false information (+5% toward misleading). The format of the response as well as the validity rating of the entity also indicate this entity provides misinformation often (+10% toward misleading). Therefore, the fact check result is a 90% likelihood that the information is false. The additional information is also able to decrease the likelihood the information is misleading. For example, if the content fact check results in a 75% likely misleading, but the validity rating of the entity is very positive, the final fact check result may be only 65% likely that the information is misleading.

In some embodiments, instead of providing a fact check result of true or false, a percentage is provided as well, such as 75% chance of false, or 60% chance of false but 80% chance of hyperbole.

In some embodiments, fact checking is based on body language of an entity in addition to or instead of the verbal or textual content. In some embodiments, using body language includes determining specific points on a user such as the user's forehead, chest, hands, fingers, mouth, cheeks, hair, arms, shoulders, legs, feet, eyes, chin, and/or any other relevant body part. Then, using the specific points, it is determined if the specific points move in a pattern/manner that would suggest the information from the user is true or false.

The body language analysis is able to learn, particularly, learn habits of specific entities to determine the validity of the entity's speech. For example, if a user tends to blink when he is lying, this is able to be learned by analyzing several television appearances. In another example, if a user tends to yell when he is losing an argument, this information is able to be learned, and then used the next time he is arguing to display to the user, "Bill is raising his voice again; he likely knows he is losing this argument." In another example, past analysis is utilized to provide a percentage such as "based on past analysis, Bill raises his voice 85% of the time when he is lying." The analysis is able to include fact checking information manually or automatically during specific conditions such as while yelling.

The body language analysis is also able to determine if the entity's comments are not synchronized with his expression. For example, an entity says, "I love this idea" and then takes two seconds to actually smile, the entity is likely not being truthful.

Speech analysis is able to be used in conjunction or instead of body language analysis as well. For example, detection of micro tremors is able to be used for speech analysis. The micro tremors indicate hesitation or other information about the speech.

In some embodiments, the tone or decibel-level of speech is used for fact checking. For example, if an entity is yelling, this is a negative aspect of conversing and results in an increased likelihood of a negative rating for the content.

In some embodiments, fact checking is based on a format of information (e.g., a response to a question). For example, instead of fact checking the substance of the information or in addition to fact checking the substance of the information, the format of the information is used for fact checking. For example, if a response to a question is a question, then this makes the fact check result more likely to be "non-responsive" or "avoiding the question." In some embodiments, fact checking is based on previous fact checks of the same entity and learning behaviors of the entity. For example, if an entity typically responds with a question when attempting to avoid answering the question, this information is used to suggest that the entity is avoiding the question. In another example, if an entity repeats a question fully when attempting to stall and not answer the question, this information is used to suggest that the entity is avoiding the question.

In some embodiments, fact checking utilizes an entity's past history for fact checking. For example, if a person has previously been determined to be providing misinformation, that person is fact checked more closely. For example, if the entity's validity rating is below a threshold, the person is fact checked using multiple fact checkers, manual fact checking, and/or utilizing a smaller set of sources (e.g., only sources with a rating above a reliability/accuracy/rating threshold).

Figures 21, 22, 23:
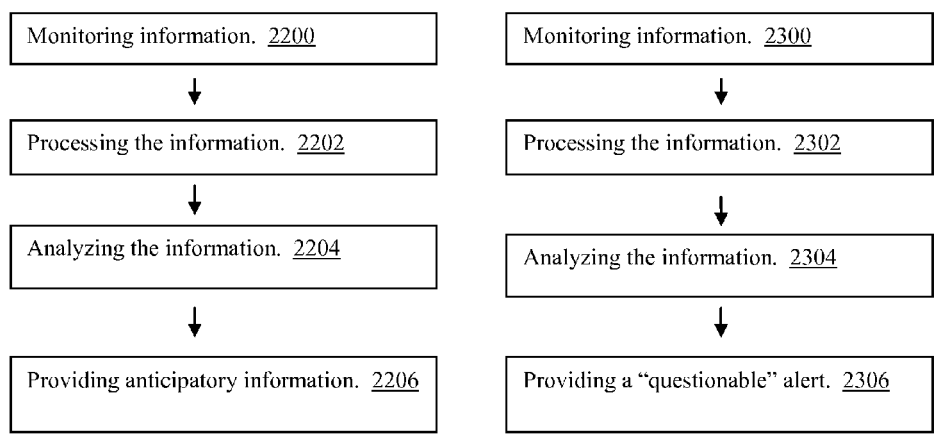
FIG. 21 illustrates a diagram of displaying fact checking results in a calendar format according to some embodiments.
FIG. 22 illustrates a flowchart of a method of implementing anticipatory fact checking according to some embodiments.
FIG. 23 illustrates a flowchart of a method of implementing questionable fact checking according to some embodiments.

FIG. 21 illustrates a diagram of displaying fact checking results in a calendar format according to some embodiments. In the calendar format, the calendar is able to be for one or more channels, programs, time slots, web pages, users, entities, and/or any other information. For example, a calendar for the program, "The News Situation Room" on Network Z is shown. The calendar is able to include icons such as X's, dots, circles, smiley faces, question marks, or any other icon to represent a fact check result. For example, an X represents misinformation, dots represent misleading information, circles represent biased information, and question marks represent questionable information. In some embodiments, the icons are color coded to indicate the speaker/provider of the information (e.g., commentator X). In some embodiments, the icons are all the same type of character but with color coding to differentiate. For example, only dots are used, but red represents misinformation and blue represents questionable information. In some embodiments, the icons are color coded based on channel/network/entity. In some embodiments, the icons are clickable/selectable for more information. For example, after a user selects an icon, the comment and the fact check result are presented. In some embodiments, clicking on a day expands the view to present additional information for that day. In some embodiments, the calendar is easily expanded and contracted (e.g., zoom in to single hour and zoom out to 1 year calendar). For example, in the year view, months are shown with several icons and a number next to each icon indicating how many of each characterization occurred in that month. In the day view, the display is separated by hours and icons are displayed for each hour. The expansion and contraction is able to be by pinching fingers on the screen or any other manner. In some embodiments, multiple channels are displayed for comparison purposes. In some embodiments, the multiple channels are separated by hours, so that each show during a time period is comparable with another show in that time period.

FIG. 22 illustrates a flowchart of a method of implementing anticipatory fact checking according to some embodiments. In the step 2200, information is monitored. In the step 2202, the information is processed. In the step 2204, the processed information is analyzed (e.g., keywords are searched for within the information). In the step 2206, anticipatory information is provided. In some embodiments, additional or fewer steps are implemented.

In some embodiments, anticipatory fact checking is implemented. For example, fact checking is performed before a statement is made. For example, a Republican mentions "Global Warming," it can be preemptively pointed out that Republican is going to argue it is not man made, and the opposing side is going to argue it is with facts to support his argument. The anticipatory fact checking is able to go further as well such as retrieving recent comments/articles/data regarding the topic and presenting an argument or comment based on that information. For example, the Republican is likely going to cite a recent study that showed temperatures are decreasing. Additional prior comments are able to be analyzed. For example, comments made earlier in the same show, earlier that day, or even earlier are analyzed. Other elements are able to be analyzed as well, such as each entity's position, company/organization, and/or any other relevant information to anticipate arguments, positions, and/or any other comments. Additional elements are able to be used as well for anticipatory computing such as body language, speech analysis, speech format, facial/voice recognition and/or any other information. After analyzing the information, any anticipatory information is able to be presented to inform the user ahead of time. The anticipatory computing is able to be used to project, in advance, topics and arguments based on show guests/hosts/other information. For example, it is known that guest A is going to be on show Z (for example, from television guide information available a day or week before the show airs). Guest A is a climatologist and recent weather has been hot, so it can be anticipated that guest A will discuss global warming. In some embodiments, the anticipatory fact checking detects an entity by facial recognition and detects keywords, and based on the detected information, anticipates comments, topics or discussions, and provides anticipatory comments. In some embodiments, the anticipatory comments/information are compared with the actual comments to determine if the anticipatory information is helpful/accurate.

FIG. 23 illustrates a flowchart of a method of implementing questionable fact checking according to some embodiments. In the step 2300, information is monitored. In the step 2302, the information is processed. In the step 2304, the information is analyzed based on sentence structure, entity detection, past history of the entity, keyword detection, and/or topic detection. In the step 2306, a "questionable" alert is provided. In some embodiments, fewer or additional steps are implemented.

In some embodiments, a questionable fact checker is implemented. The questionable fact checker is able to be implemented in any number of ways. In some embodiments, the questionable fact checker detects a comment with a keyword or phrase, and instead of performing a fact check, simply alerts the user that the comment may be "questionable," so that the user may investigate further. In some embodiments, a speaker is detected (e.g., using voice and/or facial recognition, title recognition, or other identification information) in addition to keyword detection to provide the alert. For example, Speaker X is recognized using facial recognition, and based on previous fact checks of Speaker X, it is known that he provides misinformation often (e.g., has a low validity rating), particularly in relation to specific types of keywords (e.g, related to Democrats and taxes). Upon detection of the keywords "Obama" and "taxes," an alert is presented that the information may be questionable or incorrect. In some embodiments, entities and topics/keywords are classified, so that if an entity from a first classification is detected with a keyword from a second classification, a "questionable" alert is presented. For example, Commentator Z is classified in a first classification (e.g., conservative) and the keyword "Obama" is classified in a second classification (e.g., liberal), and when both are detected a "questionable" alert is presented. Furthering the example, additional data indicates that when the commentator and that keyword are detected, the information is typically misleading based on previous data analysis. In some embodiments, a database of entities, keywords, recommended sources, and/or any other relevant information is stored to provide a "questionable" alert. In some embodiments, sources are recommended for researching the questionable information. The recommendations are able to be based on keywords detected, personal user information, and/or any other relevant information. In some embodiments, no fact checking is performed in real-time.

In some embodiments, it is determined how to display the fact check results based on a device's capabilities/qualities. For example, if the device is determined to be a television, then full text is displayed, but if the device is determined to be a tablet device, then partial text and icons are displayed, and if the device is determined to be a smart phone, then only icons are displayed. In another example, if the screen size of the device is greater than a first threshold, then full text is displayed, and if the screen size of the device is smaller than the first threshold but larger than a second threshold, then a partial text and icons are displayed, and if the screen size is smaller than the second threshold, then only icons are displayed. Determining the type of device is able to be performed in any manner such as analyzing a data file that indicates device specifications or based on a device name and looking up the device name and specifications.

In some embodiments, to resolve an issue with a speaker speaking too quickly, the fact checking system is able to record the information and slow down the information, and perform a fact check on the slowed down information. In some embodiments, slowed down information is able to be parsed easier. In some embodiments, slowed down information is compared with a slowed down word detection source (for example, both the monitored information and the source information are slowed down and compared).

In some embodiments, the sources are rated using a rating system so that sources that provide false or inaccurate information are rated as poor or unreliable and/or are not used, and sources that rarely provide misinformation are rated as reliable and are used and/or given more weight than others. For example, if a source's rating falls or is below a threshold, that source is not used in fact checking. In some embodiments, users are able to designate the threshold.

In some embodiments, source information is weighted. The source information is able to be weighted based on the size of the source. For example, a long article over 10 pages is given extra weight, and short articles are provided less weight. In an opposite example, a short, pithy article of 1 page is given extra weight, and long articles are given less weight.

In some embodiments, only "trusted" sites are used as sources. For example, "trusted" sites are ones verified by Verisign or another validation site which provides a specialized certificate. In some embodiments, only sites that have been automatically and/or manually checked for factual accuracy are used as sources. For example, a special fact checking group verifies web pages or web sites and gives each web page or web site a rating (e.g., A-F).

In some embodiments, fact checking is implemented without monitoring/listening. For example, fact check results and/or other information are automatically provided in conjunction with content. The fact checking is able to be performed manually or automatically, but the results are embedded with the content and/or transmitted with the content and displayed at the appropriate times.

In some embodiments, a fact checking application is able to toggle between email mode, television mode, web page mode, and/or any other mode. In some embodiments, the toggling is manual, and in some embodiments, the toggling is automatic. In some embodiments, the toggling is automatic based on detecting a specific type of information (e.g., the device determines text is in an email format, or the device determines a television is being watched by hearing the television audio or receiving a signal).

In some embodiments, technology is implemented to ignore extraneous information such as viewers talking during a television program, when the television program is being fact checked. For example, noise canceling is implemented so that only the television program is "listed to." In some embodiments, the noise canceling is implemented by monitoring the television content in silence or near silence to acquire distinct features of the television content, so that the appropriate information is monitored when the noise is present. Similarly, when web page information is fact checked, each aspect of text is associated with an entity (by determining which entity corresponds with which text), so that an entity is not blamed for misinformation made by another entity. In some embodiments, both television and user comments are fact checked. The fact check implementation determines and labels each speaker (e.g., TV and Bob). Then, when a fact check result is presented, it is labeled with the speaker's name and/or device.

In some embodiments, many or all devices in a home are operably coupled to listen to, send/receive, and/or fact check information. For example, a toaster in Room A hears, "I did not," then the person walks into the next room and the television hears "say that." The segments are able to be pieced together and fact checked. Send all information to a central device which fact checks or sends complete segments to be fact checked. The devices are able to detect which device to user to provide the result. For example, a user is detected in the family room, and the television in that room is used to display the fact check result.

In some embodiments, the efficient fact checking system is a smartphone application including, but not limited to, an iPhone®, Droid® or Blackberry® application. In some embodiments, a broadcaster performs the fact checking. In some embodiments, a user's television performs the fact checking. In some embodiments, a user's mobile device performs the fact checking and causes (e.g., sends) the results to be displayed on the user's television and/or another device. In some embodiments, the television sends the fact checking result to a smart phone.

Utilizing the efficient fact checking system, method and device depends on the implementation to some extent. In some implementations, a television broadcast uses fact checking to fact check what is said or shown to the viewers, and a mobile application, in some embodiments, uses fact checking to ensure a user provides factually correct information. Other examples include where web pages or social networking content (e.g., tweet or Facebook® page) are processed, fact checked efficiently, and a result is provided. The fact checking is able to be implemented without user intervention. For example, if a user is watching a news program, the fact checking is able to automatically occur and present the appropriate information. In some embodiments, users are able to disable the fact checking if desired. Similarly, if a user implements fact checking on his mobile application, the fact checking occurs automatically. For a news company, the fact checking is also able to be implemented automatically, so that once installed and/or configured, the news company does not need take any additional steps to utilize the fact checking. In some embodiments, the news company is able to take additional steps such as adding sources. In some embodiments, news companies are able to disable the fact checking, and in some embodiments, news companies are not able to disable the fact checking to avoid tampering and manipulation of data. In some embodiments, one or more aspects of the fact checking are performed manually.

In operation, the efficient fact checking system, method and device enable information to be fact checked in real-time and automatically (e.g., without user intervention). The monitoring, processing, fact checking and providing of status are each able to occur automatically, without user intervention. Results of the fact checking are able to be presented nearly instantaneously, so that viewers of the information are able to be sure they are receiving accurate and truthful information. Additionally, the fact checking is able to clarify meaning, tone, context and/or other elements of a comment to assist a user or viewer. By utilizing the speed and breadth of knowledge that comes with automatic, computational fact checking, the shortcomings of human fact checking are greatly overcome. With instantaneous or nearly instantaneous fact checking, viewers will not be confused as to what information is being fact checked since the results are posted instantaneously or nearly instantaneously versus when a fact check is performed by humans and the results are posted minutes later. The rapid fact checking provides a significant advantage over past data analysis implementations. Any of the steps described herein are able to be implemented automatically. Any of the steps described herein are able to be implemented in real-time or non-real-time.

Examples of Implementation Configurations

Although the monitoring, processing, fact checking and indicating are able to occur on any device and in any configuration, these are some specific examples of implementation configurations. Monitoring, processing, fact checking and providing all occur on a broadcaster's devices (or other emitters of information including, but not limited to, news stations, radio stations and newspapers). Monitoring, processing and fact checking occur on a broadcaster's devices, and providing occurs on an end-user's device. Monitoring and processing occur on a broadcaster's devices, fact checking occurs on a broadcaster's devices in conjunction with third-party devices, and providing occurs on an end-user's device. Monitoring occurs on a broadcaster's devices, processing and providing occur on an end-user's device, and fact checking occurs on third-party devices. Monitoring, processing, fact checking, and providing all occur on third-party devices. Monitoring, processing, fact checking, and providing all occur on an end-user's device. Monitoring, processing and fact checking occur on a social networking site's device, and providing occurs on an end-user's device. These are only some examples; other implementations are possible. Additionally, supplemental information is able to be monitored for, searched for, processed and/or provided using any of the implementations described herein.

Fact checking includes checking the factual accuracy and/or correctness of information. The type of fact checking is able to be any form of fact checking such as checking historical correctness/accuracy, geographical correctness/accuracy, mathematical correctness/accuracy, scientific correctness/accuracy, literary correctness/accuracy, objective correctness/accuracy, subjective correctness/accuracy, and/or any other correctness/accuracy. Another way of viewing fact checking includes determining the correctness of a statement of objective reality or an assertion of objective reality. Yet another way of viewing fact checking includes determining whether a statement, segment or phrase is true or false.

Although some implementations and/or embodiments have been described related to specific implementations and/or embodiments, and some aspects/elements/steps of some implementations and/or embodiments have been described related to specific implementations and/or embodiments, any of the aspects/elements/steps, implementations and/or embodiments are applicable to other aspects/elements/steps, implementations and/or embodiments described herein.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
  a. automatically fact checking web page information by comparing the web page information with source information to generate a result, wherein comparing includes:
    i. searching for an exact match of the web page information in the source information and returning the exact match search result of the exact match search if the exact match is found;
    ii. otherwise, if the exact match is not found, then utilizing pattern matching for fact checking and returning the result of the pattern matching fact check if a pattern matching result confidence score is above a pattern matching result confidence threshold;
    iii. otherwise, if the pattern matching result confidence score is not above the pattern matching result confidence threshold, then utilizing a natural language search for fact checking and returning the result of the natural language fact check if a natural language result confidence score is above a natural language result confidence threshold; and iv. otherwise, returning a negative result value as the result; and b. automatically presenting a status of the web page information in real-time based on the result of the comparison of the web page information with the source information, wherein searching for the exact match begins searching the source information located on a fastest access time hardware device, then using the source information located on a second fastest access time hardware device, and then using the source information located on slower access time hardware devices until a device list has been exhausted;

wherein utilizing pattern matching begins utilizing the source information located on the fastest access time hardware device, then using the source information located on the second fastest access time hardware device, and then using the source information located on the slower access time hardware devices until the device list has been exhausted; and wherein the natural language search begins searching the source information located on the fastest access time hardware device, then using the source information located on the second fastest access time hardware device, and then using the source information located on the slower access time hardware devices until the device list has been exhausted; and wherein most popular, most recent and most common information is stored in the fastest access time hardware device, and less popular, less recent and less common information is stored in the slower access hardware devices.

2. The method of claim 1 wherein searching for the exact match begins searching the source information located in a designated fact checking database, then goes to a broader set of source information, and repeatedly goes to broader sets of source information until a broadest source information set has been exhausted;

wherein utilizing pattern matching begins utilizing the source information located in the designated fact checking database, then goes to the broader set of source information, and repeatedly goes to broader sets of source information until the broadest source information set has been exhausted; and wherein the natural language search begins searching the source information located in the designated fact checking database, then goes to the broader set of source information, and repeatedly goes to broader sets of source information until the broadest source information set has been exhausted.

3. The method of claim 1 wherein searching for the exact match begins searching the source information classified by a plurality of keywords found in the web page information, then using the source information classified by a single keyword found in the web page information, and then using the source information classified by keywords related to the keywords found in the web page information;

wherein utilizing pattern matching begins utilizing the source information classified by the plurality of keywords found in the web page information, then using the source information classified by the single keyword found in the web page information, and then using the source information classified by the keywords related to the keywords found in the web page information; and wherein the natural language search begins searching the source information classified by the plurality of keywords found in the web page information, then using the source information classified by the single keyword found in the web page information, and then using the source information classified by the keywords related to the keywords found in the web page information.

4. The method of claim 1 further comprising parsing the web page information into segments and prioritizing the segments, so that a highest priority segment is fact checked first, wherein priority is based on the relatedness of the segment to a current topic being discussed and when the segment was presented, wherein if the segment is not fact checked before a timeout threshold, then the segment is removed from a fact check queue.

5. The method of claim 4 wherein a plurality of fact check queues are implemented, wherein a first fact check queue contains the segments to be fact checked in real-time, and the second fact check queue contains the segments to be fact checked in non-real-time.

6. The method of claim 1 further comprising parsing the web page information into segments and prioritizing the segments, so that a highest priority segment is fact checked first, wherein priority is based on a presenter of the web page information, wherein if the presenter of the web page information has a validity rating below a first validity threshold, then the segments of the web page information from the presenter are prioritized in a highest priority group, and if the presenter of the web page information has the validity rating above the first threshold and below a second threshold, then the segments of the web page information from the presenter are prioritized in a second highest priority group which has a lower priority than the highest priority group, and if the presenter of the web page information has the validity rating above the second threshold, then the segments of the web page information from the presenter are prioritized in a third highest priority group which has a lower priority than the second highest priority group.

7. The method of claim 1 further comprising parsing the web page information into phrases, parsing the phrases into words, counting the number of words in each phrase, and comparing each phrase with the source information containing the same number of words as the number of words in the phrase being compared.

8. The method of claim 7 wherein the source information includes only source information in a classification matching a keyword detected in the web page information.

9. The method of claim 1 further comprising parsing the web page information into phrases, parsing the phrases into words, counting the number of words in each phrase, and comparing each phrase with the source information containing one more word than the number of words in the phrase being compared.

10. The method of claim 1 further comprising parsing the web page information into segments, and only fact checking randomly selected segments.

11. The method of claim 1 further comprising utilizing a plurality of fact checking implementations initially, wherein each fact checking implementation utilizes a different set of source information, and comparing results of each fact checking implementation, and iteratively eliminating a fact checking implementation of the plurality of fact checking implementations with a lowest confidence score until a single fact checking implementation remains.

12. The method of claim 11 wherein utilizing the plurality of fact checking implementations initially occurs in the first minute of a video.

13. The method of claim 11 wherein the single fact checking implementation determined by eliminating other fact checking implementations is utilized for a specific type of content and is reused for future content that is the same type of content as the specific type of content.

14. The method of claim 11 wherein utilizing a plurality of fact checking implementations initially occurs in parallel while a previously determined best fact checking implementation is utilized for fact checking the web page information.

15. The method of claim 1 further comprising utilizing a plurality of fact checking implementations initially, wherein each fact checking implementation utilizes a different set of source information, and comparing results of each fact checking implementation, and iteratively eliminating any fact checking implementations of the plurality of fact checking implementations with a confidence score below a threshold until two fact checking implementations remain and are used in a continuous, competitive fact checking implementation wherein the results of the two remaining fact checking implementations are compared to determine a final fact check result.

16. The method of claim 1 wherein searching for the exact match begins searching the source information controlled by a media company, then using crowdsourced data as the source information, and then using world wide web data for fact checking;
    wherein utilizing pattern matching begins utilizing the source information controlled by the media company, then using the crowdsourced data as the source information, and then using the world wide web data for fact checking; and
    wherein the natural language search begins searching the source information controlled by the media company, then using the crowdsourced data as the source information, and then using the world wide web data for fact checking.

17. A method programmed in a non-transitory memory of a device comprising:
    a. automatically fact checking web page information by comparing the web page information with source information to generate a result, wherein comparing includes:
        i. implementing a first fact check implementation for fact checking the web page information using the source information and returning a first fact check result of the first fact check implementation if the first fact check result of the first fact check is above a first confidence threshold;
        ii. otherwise, if the first fact check result is not above the first confidence threshold, then implementing a second fact check implementation for fact checking the web page information using the source information and returning a second fact check result of the second fact check implementation if the second fact check result of the second fact check is above a second confidence threshold;
        iii. otherwise, if the second fact check result is not above the second confidence threshold, then implementing a third fact check implementation for fact checking the web page information using the source information and returning a third fact check result of the third fact check implementation if the third fact check result of the third fact check is above a third confidence threshold; and
        iv. otherwise, returning a negative result value as the result; and
    b. automatically presenting a status of the web page information in real-time based on the comparison of the web page information with the source information,
    wherein implementing the first fact check implementation begins searching the source information located on a fastest access time hardware device, then using the source information located on a second fastest access time hardware device, and then using the source information located on slower access time hardware devices until a device list has been exhausted;
    wherein implementing the second fact check implementation begins utilizing the source information located on the fastest access time hardware device, then using the source information located on the second fastest access time hardware device, and then using the source information located on the slower access time hardware devices until the device list has been exhausted; and
    wherein implementing the third fact check implementation begins searching the source information located on the fastest access time hardware device, then using the source information located on the second fastest access time hardware device, and then using the source information located on the slower access time hardware devices until the device list has been exhausted; and
    wherein most popular, most recent and most common information is stored in the fastest access time hardware device, and less popular, less recent and less common information is stored in the slower access hardware devices.

18. A device comprising:
    a. a non-transitory memory for storing an application for automatically performing the following steps:
        i. fact checking web page information by comparing the web page information with source information to generate a result, wherein comparing includes:
            (1) searching for an exact match of the web page information in the source information and returning the exact match search result of the exact match search if the exact match is found;
            (2) otherwise, if the exact match is not found, then utilizing pattern matching for fact checking and returning the result of the pattern matching fact check if a pattern matching result confidence score is above a pattern matching result confidence threshold;
            (3) otherwise, if the pattern matching result confidence score is not above the pattern matching result confidence threshold, then utilizing a natural language search for fact checking and returning the result of the natural language fact check if a natural language result confidence score is above a natural language result confidence threshold; and
            (4) otherwise, returning a negative result value as the result; and
        ii. presenting a status of the web page information in real-time based on the result of the comparison of the web page information with the source information,
    wherein searching for the exact match begins searching the source information located on a fastest access time hardware device, then using the source information located on a second fastest access time hardware device, and then using the source information located on slower access time hardware devices until a device list has been exhausted;
    wherein utilizing pattern matching begins utilizing the source information located on the fastest access time hardware device, then using the source information located on the second fastest access time hardware device, and then using the source information located on the slower access time hardware devices until the device list has been exhausted;

wherein the natural language search begins searching the source information located on the fastest access time hardware device, then using the source information located on the second fastest access time hardware device, and then using the source information located on the slower access time hardware devices until the device list has been exhausted;

wherein searching for the exact match begins searching the source information located in a designated fact checking database, then goes to a broader set of source information, and repeatedly goes to broader sets of source information until a broadest source information set has been exhausted;

wherein utilizing pattern matching begins utilizing the source information located in the designated fact checking database, then goes to the broader set of source information, and repeatedly goes to broader sets of source information until the broadest source information set has been exhausted; and wherein the natural language search begins searching the source information located in the designated fact checking database, then going to the broader set of source information, and repeatedly going to broader sets of source information until the broadest source information set has been exhausted, and wherein most popular, most recent and most common information is stored in the fastest access time hardware device, and less popular, less recent and less common information is stored in the slower access hardware devices; and b. a processor for processing the application.

* * * * *